United States Patent
Koodli

(10) Patent No.: US 11,425,602 B2
(45) Date of Patent: Aug. 23, 2022

(54) LOAD BALANCING AND SERVICE SELECTION IN MOBILE NETWORKS

(71) Applicant: Google LLC, Mountain View, CA (US)

(72) Inventor: Rajeev Koodli, Mountain View, CA (US)

(73) Assignee: Google LLC, Mountain View, CA (US)

( * ) Notice: Subject to any disclaimer, the term of this patent is extended or adjusted under 35 U.S.C. 154(b) by 177 days.

(21) Appl. No.: 16/854,140

(22) Filed: Apr. 21, 2020

(65) Prior Publication Data

US 2021/0329496 A1 Oct. 21, 2021

(51) Int. Cl.
*H04W 28/08* (2009.01)
*G06N 20/00* (2019.01)
*H04L 101/654* (2022.01)
*H04W 8/08* (2009.01)
*H04W 48/18* (2009.01)

(52) U.S. Cl.
CPC .......... *H04W 28/085* (2013.01); *G06N 20/00* (2019.01); *H04L 61/6054* (2013.01); *H04W 8/08* (2013.01); *H04W 48/18* (2013.01)

(58) Field of Classification Search
CPC ..... H04W 28/085; H04W 8/08; H04W 48/18; H04W 72/04; H04L 61/6054; H04L 67/101; G06N 20/00
See application file for complete search history.

(56) References Cited

U.S. PATENT DOCUMENTS

| 10,555,253 | B2 | 2/2020 | Chandramouli et al. | |
| 2015/0249956 | A1* | 9/2015 | Salot | H04L 47/2408 370/328 |
| 2017/0310542 | A1* | 10/2017 | Nair | H04L 41/0816 |
| 2017/0331785 | A1* | 11/2017 | Xu | H04W 76/11 |
| 2018/0227842 | A1* | 8/2018 | Chandramouli | H04W 48/18 |
| 2019/0159107 | A1* | 5/2019 | Kim | H04W 8/02 |

(Continued)

FOREIGN PATENT DOCUMENTS

WO 2020018012 A1 1/2020

OTHER PUBLICATIONS

International Search Report for the related Application No. PCT/US2021/028377, dated Jul. 21, 2021, 18 pages.

*Primary Examiner* — Benjamin H Elliott, IV
(74) *Attorney, Agent, or Firm* — Honigman LLP; Brett A. Krueger

(57) ABSTRACT

A method for service selection in mobile networks includes receiving from a control plane, a request for a user plane instance. The user plane instance is configured to perform packet processing for a user equipment during a communication session. The method also includes identifying a plurality of user plane instance candidates associated with a base station in communication with the user equipment. The plurality of user plane instance candidates is configurable by the control plane. For each user plane instance candidate, the method includes determining one or more selection parameters corresponding to a subset of key performance indicators for the base station. The method further includes selecting one of the plurality of user plane instance candidates to fulfill the request for the user plane instance from the control plane based on the one or more selection parameters determined for each of the plurality of user plane instance candidates.

28 Claims, 14 Drawing Sheets

(56) References Cited

U.S. PATENT DOCUMENTS

| | | | | |
|---|---|---|---|---|
| 2019/0166647 A1* | 5/2019 | Velev | ............... | H04W 76/12 |
| 2019/0223005 A1* | 7/2019 | Avula | ............... | H04W 64/003 |
| 2019/0261213 A1* | 8/2019 | Palnati | ............... | H04W 88/16 |
| 2019/0364064 A1* | 11/2019 | Gupta | ............... | H04W 4/70 |
| 2020/0204984 A1* | 6/2020 | Dodd-Noble | ............... | H04W 8/08 |
| 2020/0260505 A1* | 8/2020 | Benson | ............... | H04M 15/66 |
| 2020/0344623 A1* | 10/2020 | Nadkarni | ............... | H04L 43/12 |
| 2021/0051517 A1* | 2/2021 | Johansson | ............... | H04W 68/005 |
| 2021/0153080 A1* | 5/2021 | Zhu | ............... | H04W 48/18 |
| 2021/0288886 A1* | 9/2021 | Ortenblad | ............... | H04W 24/10 |
| 2021/0329496 A1* | 10/2021 | Koodli | ............... | H04W 48/18 |

\* cited by examiner

LOAD BALANCING AND SERVICE SELECTION IN MOBILE NETWORKS

TECHNICAL FIELD

This disclosure relates to load balancing and service selection in mobile networks.

BACKGROUND

Cellular communication networks provide communication content such as voice, video, packet data, messaging, and broadcast for subscriber devices, such as mobile devices and data terminals. The cellular communication network may include a number of base stations that can support communication for a number of subscriber devices across dispersed geographic regions. Generally, when a user device, such as a mobile phone, initiates a communication session, the network selects service instances for the communication session. Yet unfortunately, the instances selected for the communication session may impact the communication session itself or the user's experience with the communication session if the selection process does not properly account for factors such as circumstances of the user and/or circumstances of the network when the communication session is established.

SUMMARY

One aspect of the disclosure provides a method for load balancing and service selection in mobile networks. The method includes receiving, at data processing hardware, from a control plane, a request for a user plane instance in a packet core network. The user plane instance is configured to perform packet processing for a user equipment during a communication session. The method also includes identifying, by the data processing hardware, a plurality of user plane instance candidates associated with a base station in communication with the user equipment. The plurality of user plane instance candidates is configurable by the control plane. For each user plane instance candidate, the method includes determining, by the data processing hardware, one or more selection parameters corresponding to a subset of key performance indicators for the base station in communication with the user equipment. The method further includes selecting, by the data processing hardware, one of the plurality of user plane instance candidates to fulfill the request for the user plane instance from the control plane based on the one or more selection parameters determined for each of the plurality of user plane instance candidates.

Implementations of the disclosure may include one or more of the following optional features. In some implementations, the method includes generating, by the data processing hardware, a list of user plane instance candidates based on the one or more selection parameters determined for each of the plurality of user plane instance candidates. In this implementation, selecting the one of the plurality of user plane instance candidates to fulfill the request includes sequentially selecting the user plane instance candidate from the list of user plane instance candidates based on a previously selected user plane instance from the list of user plane instance candidates.

In some examples, the method includes assigning, by the data processing hardware, a corresponding weight to each user plane instance candidate of the plurality of user plane instance candidates, the corresponding weight representing the one or more selection parameters determined for the corresponding user plane instance candidate. In this example, the method also includes ranking, by the data processing hardware, the plurality of user plane instance candidates based on the corresponding weight to each user plane instance candidate of the plurality of user plane instance candidates. Selecting the one of the plurality of user plane instance candidates to fulfill the request includes selecting the user plane instance candidate having a highest ranking as the one of the plurality of user plane instance candidates to fulfil the request for the user plane instance.

In some configurations, selecting the one of the plurality of user plane instance candidates to fulfill the request includes, determining, by the data processing hardware, that the one of the plurality of user plane instance candidates satisfies a selection criteria, the selection criteria corresponding to a minima or a maxima of the one or more selection parameters determined for each of the plurality of user plane instance candidates. Here, one of the one or more selection parameters determined for each of the plurality of user plane instance candidates may include a latency measurement associated with the corresponding user plane instance candidate and the selection criteria may include a lowest one of the latency measurements associated with the plurality of user plane instance candidates. Additionally or alternatively, one of the one or more selection parameters determined for each of the plurality of user plane instance candidates may include a load associated with the corresponding user plane instance candidate and the selection criteria may include a lowest one of the loads associated with the plurality of user plane instance candidates.

In some implementations, selecting the one of the plurality of user plane instance candidates to fulfill the request includes using a machine learning selection model configured to receive the one or more selection parameters determined for each of the plurality of user plane instance candidates and a selection criteria. In this implementation, the machine learning selection model is trained on a plurality of training groups, each training group including a plurality of training user plane instances, each training user plane instance in the corresponding training group associated with one or more corresponding selection parameters and a selection criteria label, the selection criteria label indicating whether or not the corresponding training user plane instances satisfy the selection criteria. Here, the selection criteria may include a time of day and at least one of a base station node internet protocol address, an evolved Universal Mobile Telecommunications Service Terrestrial Radio Access Network cell global identifier (ECGI), an International Mobile Equipment Identity (IMEI), or an International Mobile Subscriber Identity (IMSI). Optionally, the selection criteria may include at least one of a lowest latency or a lowest rate of transport control protocol retransmissions. The method may include receiving, by the data processing hardware, a packet core network identifier at a given time of day and the machine learning selection model may use the packet core network identifier at the given time of day to select the one of the plurality of user plane instance candidates to fulfill the request for user plane instance. Optionally, the method may include receiving, by the data processing hardware, a packet core network identifier at a given time of day and the selection of the user plane instance by the machine learning selection model may be based on the packet core network identifier at the given time of day and the user equipment associated with the request. The packet core network identifier may include a base station node internet protocol address or an evolved Universal Mobile Telecommunications Service Terrestrial Radio Access Network cell global identifier.

In some examples, the packet core network includes a fifth generation (5G) core infrastructure. Additionally or alternatively, the packet core network may include an evolved packet core network infrastructure for a fourth generation (4G) core infrastructure.

Another aspect of the disclosure provides a method for load balancing and service selection in mobile networks. The method includes receiving, at data processing hardware, from a session manager of a packet core network, a request for a control plane instance in the packet core network. The control plane instance is configured to route packets for a user equipment during a communication session. The method also includes identifying, by the data processing hardware, a plurality of control plane instance candidates associated with a mobility manager of the packet core network. The plurality of control plane instance candidates is configured to serve a geographic region of the mobility manager. For each control plane instance candidate, the method includes determining, by the data processing hardware, one or more selection parameters corresponding to a subset of key performance indicators for the mobility manager in communication with the user equipment. The method further includes selecting, by the data processing hardware, a respective control plane-instance candidate to fulfill the request for the control plane instance from the session manager based on the determined one or more selection parameters.

This aspect may include one or more of the following optional features. In some configurations, the session manager includes a session management function of the packet core network, the packet core network including a fifth generation (5G) core infrastructure. The session manager may correspond to a gateway of the packet core network, the packet core network including a fourth generation (4G) core infrastructure.

In some implementations, the method includes generating, by the data processing hardware, a list of control plane instance candidates based on the one or more selection parameters determined for each of the plurality of control plane instance candidates. In this implementation, selecting the one of the plurality of control plane instance candidates to fulfill the request includes sequentially selecting the control plane instance candidate from the list of control plane instance candidates based on a previously selected control plane instance from the list of control plane instance candidates.

In some examples, the method includes assigning, by the data processing hardware, a corresponding weight to each control plane instance candidate of the plurality of control plane instance candidates, the corresponding weight representing the one or more selection parameters determined for the corresponding control plane instance candidate. In this example, the method also includes ranking, by the data processing hardware, the plurality of control plane instance candidates based on the corresponding weight to each control plane instance candidate of the plurality of control plane instance candidates. Here, selecting the one of the plurality of control plane instance candidates to fulfill the request includes selecting the control plane instance candidate having a highest ranking as the one of the plurality of control plane instance candidates to fulfil the request for the control plane instance.

In some configurations, selecting the one of the plurality of control plane instance candidates to fulfill the request includes, determining, by the data processing hardware, that the one of the plurality of control plane instance candidates satisfies a selection criteria, the selection criteria corresponding to a minima or a maxima of the one or more selection parameters determined for each of the plurality of control plane instance candidates. Here, one of the one or more selection parameters determined for each of the plurality of control plane instance candidates may include a latency measurement associated with the corresponding control plane instance candidate and the selection criteria may include a lowest one of the latency measurements associated with the plurality of control plane instance candidates. Optionally, one of the one or more selection parameters determined for each of the plurality of control plane instance candidates may include a load associated with the corresponding control plane instance candidate and the selection criteria may include a lowest one of the loads associated with the plurality of control plane instance candidates.

In some implementations, selecting the one of the plurality of control plane instance candidates to fulfill the request includes using a machine learning selection model configured to receive the one or more selection parameters determined for each of the plurality of control plane instance candidates and a selection criteria. In this implementation, the machine learning selection model is trained on a plurality of training groups, each training group including a plurality of training control plane instances, each training control plane instance in the corresponding training group associated with one or more corresponding selection parameters and a selection criteria label, the selection criteria label indicating whether or not the corresponding training control plane instances satisfy the selection criteria. Here, the selection criteria may include a time of day and at least one of a Mobile Management Entity (MME), an Access and Mobility Management Function (AMF), an International Mobile Equipment Identity (IMEI), or an International Mobile Subscriber Identity (IMSI). Optionally, the selection criteria may include at least one of a lowest latency or a lowest rate of General Packet Radio Service Tunneling Protocol retransmissions. In some examples, the method includes receiving, by the data processing hardware, an identifier of a mobility manager at a given time of day and the machine learning selection model uses the identifier of the mobility manager at the given time of day to select the one of the plurality of control plane instance candidates to fulfill the request for control plane instance. In other examples, the method includes receiving, by the data processing hardware, a packet core network identifier at a given time of day, and the machine learning selection model uses the identifier of the mobility manager at the given time of day and the user equipment associated with the request to select the one of the plurality of control plane instance candidates to fulfill the request for control plane instance. The identifier of the mobility manager may identify a Mobile Management Entity (MME). Additionally or alternatively, the identifier of the mobility manager may identify an Access and Mobility Management Function (AMF).

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
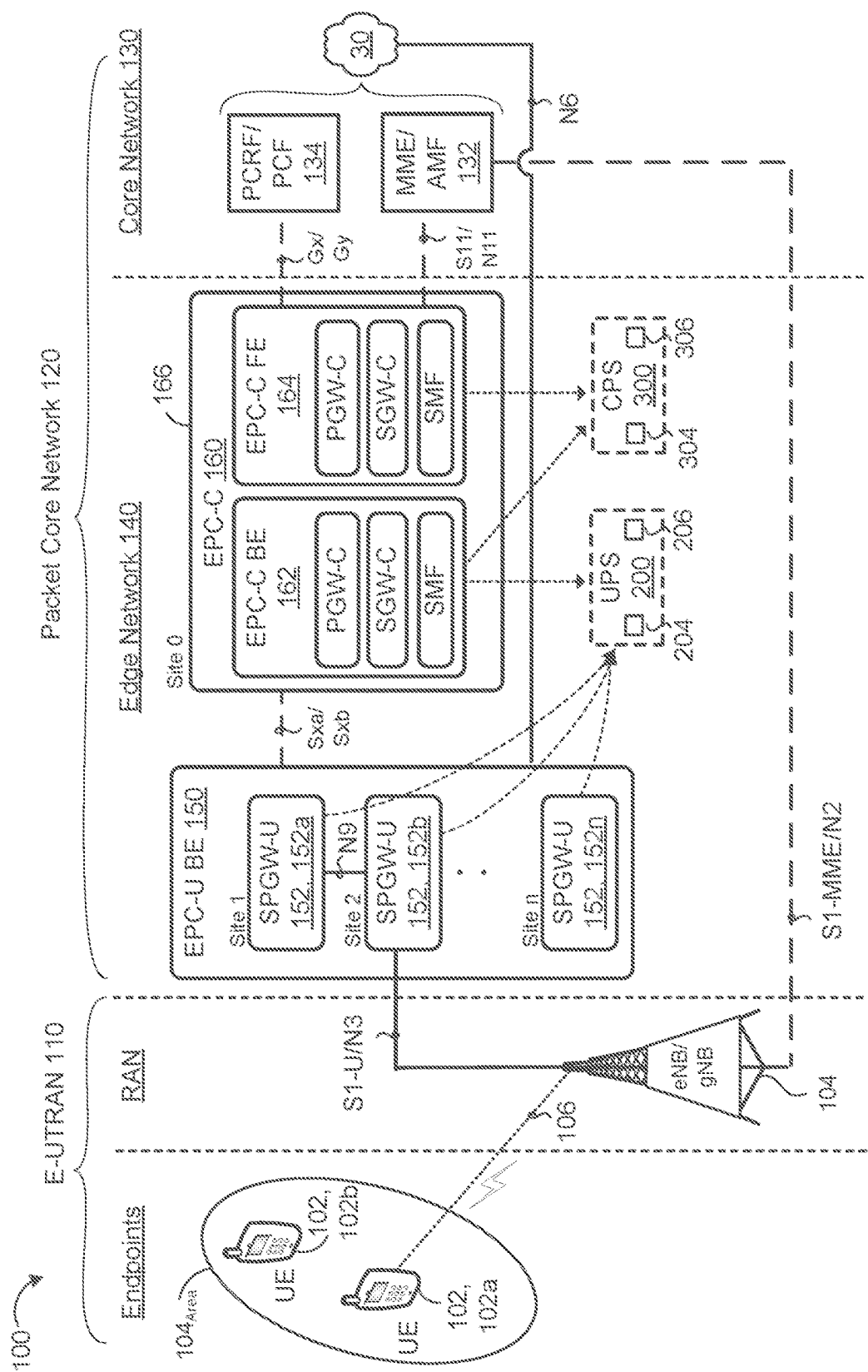
FIG. 1 is a schematic view of an example communication network.

As mobility and connectivity for devices increase, mobile networks and their resources are increasing in their demand. Unlike resource demands for mobile networks in the past, this demand is more complex due to an evolution of mobile devices. For instance, mobile networks that once predominantly supported mobile communication for mobile phones, now support almost any computing device that has been configured with connectivity for a mobile network. Mobile devices have expanded from mobile phones, tablets, laptops, and personal display devices to an array of smart devices, such as smart wearables (e.g., watches, heart monitors, etc.), smart peripherals (e.g., speakers, headphones, etc.), smart appliances, and smart sensors. Furthermore, the very nature of traditional mobile phones has changed with advanced computing and micro processing from a device that relies on a mobile network for telephony services to a device more akin to a personal computer with functionality such as media streaming, mobile applications, electronic mail, and internet connectivity. Such functionality has even shifted the common mode of communication between people from a telephone call to a text message.

With constant changes to the mobile phone itself, and the increased usage of different types of mobile devices, mobile networks are having to address different types of connectivity needs. In other words, whereas mobile networks historically had relatively predictable resource demands, mobile networks today are now subject to increased variation in resource demand. For instance, network loads today support an increased use of mobile video and real-time communication applications. When resource demands on a mobile network were relatively predictable, the signaling functions of the network performed by a control plane and the data packet forwarding of a user plane were also relatively predictable. Due to such predictability, the control plane and the data plane were generally coupled together in a mobile network structure. Yet as resource demands have begun to vary, this variation has altered resource demands with respect to control plane and user plane resource requirements. Some devices demand a large amount of control plane resources (e.g., signaling resources), while other devices demand a small amount of signaling resources. The same may be true for the user plane where some devices may have large demands for data resources while others have relatively small demands for data resources.

Based on the disparity of resource demands, mobile networks transmitting data packets using a core network centralized around general packet radio service (GPRS) transitioned to a packet core network (e.g., an evolved packet core (EPC) for 4G or a fifth generation core (5GC) for 5G). With the network architecture of packet core network, the structure of the packet core network separated the user plane that manages user (e.g., subscriber) data and the control plane that manages signaling of user data through the network. This approach has generally been referred to as Control and User Plane Separation (CUPS). CUPS sought to provide flexible network deployment were the control plane and the user plane may be independently scaled while not affecting the functionality of other nodes of the packet core network. By independently scaling the user plane and the control plane, a CUPS configuration allows a mobile network to address user traffic on an as-needed basis in real-time. Therefore, the packet core network is capable of addressing increased user data traffic from a proliferation of video and other mobile applications that mobile networks currently experience.

In addition to independent scaling, a decoupling of the user plane and control plane may enable these planes to reside in an edge network. An edge network generally refers to a portion of a packet core network that is located close to where devices and their users use a mobile network (e.g., consume data). In other words, the "edge" refers to locations near endpoints of a mobile network (e.g., user equipment) and an edge network is where a part of a distributed computing topology of the mobile network resides. Accordingly, an edge network brings computing and/or data storage closer to endpoints.

Although user planes and control planes are separate and/or able to reside in edge networks, the selection of which user plane instance and/or control plane instance to use in a communication session with user equipment (UE) may impact network performance and/or a user's experience with the network. For example, if the assignment of a user plane instance and/or a control plane instance contributes to negative factors, such as latency or packet loss, the assignment may detrimentally impact a user's experience with the network. Thus, depending on the communication functions that a UE wants to perform, selection of a user plane instance and/or a control plane instance may be crucial to the performance of network services for the user. Furthermore, the selection of a user plane instance and/or control plane instance may not depend solely on the functions that a specific user wants to perform, but also other factors, such as where a user is located, a time of day for the selection, the current load on the mobile network at the time of selection, the current access patterns of users of the mobile network, etc. In other words, a decision to select a service instance (i.e., a control plane instance or a user plane instance) becomes increasingly complicated, especially when an increased number of mobile devices cause a mobile network to experience a large number of service instance requests at any one time. Accordingly, the user plane selector and/or the control plane selector disclosed herein attempt to address deficiencies with service instance selection.

With the ongoing improvements to mobile networks, network infrastructure is being built closer to the user (e.g., endpoints) and/or the user's radio access network (RAN). In these improved mobile networks, an air interface latency corresponding to the time it takes a UE, such as a mobile device, to communicate with a base station (e.g., RAN antenna) has been reduced. For example, in a fifth generation (5G) network infrastructure, the air interface latency has been reduced to under five milliseconds. As a comparison, previous generations of mobile networks, for example, a third generation (3G) mobile network, had an air interface latency of 80-100 milliseconds or more. With a low amount of air interface latency (e.g., less than five milliseconds), various mobile applications are possible, but without the function of these applications being latency-sensitive, latency issues may shift to being the fault of the packet core network portion of a mobile network Stated differently, when the air interface latency was eighty or more milliseconds, the communication between UEs and the RAN infrastructure (e.g., base station(s)) was the network bottleneck; thus, functions of the mobile network in the EPC could occur within this air interface latency window without contributing to further latency issues. For instance, if the network takes 5-10 milliseconds to send and to retrieve a data packet from an packet core network data center in a 3G network (e.g., with eighty milliseconds of air interface latency), such function would not contribute to additional latency, but in a 5G network (e.g., with five milliseconds of air interface latency), these packet core network functions have introduced five or more seconds of latency to the task. Now with such a low degree of air interface latency, how the packet core network functions may impact the user's (e.g., the mobile network subscriber's) experience. To be sensitive to the potential of latency issues in mobile networks, the control plane selector and/or the user plane selector aims to select a service instance that fits a user's function. From this perspective, when possible, each plane selector (e.g., the user plane selector and/or the control plane selector) attempts to best support the instance of the user.

FIG. 1 illustrates a communication network 100 (also referred to as a cellular network), which may be a Long-Term Evolution (LTE) network, a 5G network, and/or a multiple access network supporting numerous access technologies specified by the $3^{rd}$ Generation Partnership Project (3GPP), such as the General Packet Radio Service (GPRS), the Global System for Mobile Communications/Enhanced Data Rates for GSM Evolution (GSM/EDGE), the Universal Mobile Telecommunication System/High Speed Packet Access (UMTS/HSPA), LIE and LTE advanced network technologies. The cellular network 100 (e.g., LTE network or 5G network) enables wireless communication of high-speed data packets between subscriber devices 102, 102a-b, such as mobile devices and data terminals, and a base station 104. The subscriber devices 102 may be interchangeably referred to as user equipment (UE) devices and/or mobile devices 102. For instance, LTE is a wireless communication standard that is based on the GSM/EDGE and UMTS/HSPA network technologies and configured to increase the capacity and speed of the telecommunication by using different radio interfaces in addition to core network improvements. Different types of cellular networks 100 may support different bands/frequencies at various bandwidths to allow UE devices 102 to communicate data (e.g., data packets). To illustrate, LTE supports scalable carrier bandwidths, from 1.4 MHz to 20 MHz and supports both frequency division duplexing (FDD) and time-division duplexing (TDD) while 5G supports bandwidths ranging from 5 MHz to 100 MHz where some bandwidths overlap with LTE.

UE devices 102 may be any telecommunication device that is capable of transmitting and/or receiving voice/data over the network 100. UE devices 102 may include, but are not limited to, mobile computing devices, such as laptops, tablets, smart phones, and wearable computing devices (e.g., headsets and/or watches). UE devices 102 may also include other computing devices having other form factors, such as computing devices included in desktop computers, smart speakers/displays, vehicles, gaming devices, televisions, or other appliances (e.g., networked home automation devices and home appliances). UE devices 102 subscribe to network services provided by a network operator of the communication network 100. The network operator may also be referred to as a mobile network operator (MNO), a wireless service provider, wireless carrier, cellular company, or mobile network carrier.

The UE devices 102 may communicate with an external network 30, such as a packet data network (PDN), through the communication network 100 (or 5G/4G network). Referring to FIG. 1, the communication network 100 represents a distributed architecture for a mobile network. The communication network 100 includes a first portion, an Evolved Universal Terrestrial Radio Access Network (e-UTRAN) portion 110, and a second portion, a packet core network portion 120. The packet core network portion 120 may generally refer to either an Evolved Packet Core (EPC) for fourth generation (4G) core infrastructure or a fifth generation (5G) core infrastructure (i.e., 5GC). The first portion 110 includes an air interface 106 (e.g., Evolved Universal Terrestrial Radio Access (e-UTRA) of 3GPP's LT E upgrade path) that interfaces between endpoints, such as UEs 102 and a radio access network (RAN) of one or more base stations 104. In LTE, the air interface 106 uses orthogonal frequency-division multiple access (OFDMA) radio-access for the downlink and Single-carrier FDMA (SC-FDMA) for the uplink. Accordingly, the first portion 110 supports radio communication of data packets and/or other surfaces from the external network 30 to the UE devices 102 over the air interface 106 via one or more base station 104.

Each base station 104 may include an evolved Node B (also referred as eNode B or eNB in 4G systems) or, with respect to a 5G system, a next generation Node B (also referred to as a gNB). An eNB/gNB 104 includes hardware that connects to the air interface 106 (e.g., a mobile phone network) for communicating directly with the UE devices 102. For instance, the eNB/gNB 104 may transmit downlink LTE/5G signals (e.g., communications) to the UE devices 102 and receive uplink LTE/5G signals from the UE devices 102 over the air interface 106. A base station 104 may have an associated coverage area $104_{area}$ that corresponds to an area where one or more JE devices 102 communicate with the network 100 by way of the base station 104. For 4G network, when the base station 104 is an eNB, the base station 104 uses an S1 interface for communicating with the packet core network 120 (e.g., with the core network portion 122 of the packet core network 120). The S1 interface may include an S1-MME interface for communicating with a Mobility Management Entity (MME) 132 of the core network 130 and an S1-U interface for interfacing with a Serving Gateway (SGW, e.g., shown in FIG. 1 as a combination of a Serving Gateway and a Packet Data Node Gateway (SPGW)). Accordingly, the S1 interface is associated with a backhaul link for communicating with the packet core network 120. For a 5G network, when the base station 104 is a gNB, the gNB uses a N2 and a N3 interface to connect to 5G core network control plane and user plane functions. For example, the N2 interface is an interface for communication between the gNB 104 and an Access and Mobility Management Function (AMF) while the N3 interface is an interface for communication between the gNB and a backend user plane 150 of an edge network 140.

Generally speaking, the packet core network 120 (e.g., an EPC or a 5GC) communicates with the UE devices 102 and the external network 30 to route data packets therebetween. As such means of communication, the packet core network 120 provides a framework configured to converge voice and data on the LTE/5G network 100. The packet core network 120 unifies voice and data on an Internet Protocol (IP) service architecture and voice is treated as just another IP application. The packet core network 120 includes, without limitation, a core network 130 and an edge network 140. In a 4G network, the core network 130 may include several network elements, such as, for example, the MME 132, a Policy and Charging Rules Function (PCRF) 134, a Home Subscriber Server (HSS) (not shown), and a Serving GPRS Support Node (SGSN) (not shown). Whereas for a 5G network, the core network 130 includes an Access and Mobility Management Function (AMF) 132 instead of the MME 132 and a Policy, Charging Function (PCF) 134 as the 5G equivalent to the PCRF 134. In both 4G and 5G networks, the edge network 140 may include the separation of the user plane and the control plane. In other words, each of the Serving Gateway (SGW) and the Packet Data Node Gateway (PGW) have a control plane portion 150 (e.g., shown with a designated "-C") and a user plane portion 160 (e.g., shown with a designated "-U").

In some examples, such as FIG. 1, the edge network 140 is divided into different front end (FE) network elements (e.g., facing the core network 130 and the external network 30) and backend network elements (BE) (e.g., facing the e-UTRAN portion 110 of the network 100). With this division, FIG. 1 illustrates that the control plane portion 160 may be split further into a back end control plane 162 and a front end control plane 164. In 5G networks, in addition to the SGW and PGW elements, the control plane portion 160 also includes a Session Management Function (SMF). Here, the SMF includes functions on both the front end (FE) and the backend (BE) of the control plane portion 160. Although FIG. 1 depicts that the PGW and the SGW may be integrated (e.g., by the SPGW element), other network elements, such as the MME/AMF 132, the PCRF/PCF 134, SGSN, and the HSS, may be standalone components, or at least two of the components may be integrated together.

The network 100 includes interfaces that allow the UE devices 102, the base stations 104, and various network elements (e.g., the MME 132, the PCRF/PCF 134, the SPGW, the SGSN, the HSS, the SMF) to cooperate with each other during use of the network 100. Information flows along these interfaces throughout the network 100 and generally these interfaces may be divided by user plane function and control plane function. The user plane function routes user plane traffic and includes a user plane protocol stack between the UE devices 102 and the base station 104 with sublayers, such as packet data convergence protocol (PDCP), radio link control (RLC), and medium access control (MAC). The user plane function may be shared by multiple control plane functions. A user plane data packet may traverse multiple user plane functions. Some interfaces specific to the user plane portion 150 are as follows: a S1-U interface between the base station 104 and the SPGW-U of the control plane portion 150 for per bearer user plane tunneling and inter base station path switching during handover; an N3 interface (e.g., in 5G) between a base station 104 and the user plane portion 150 where the N3 interface may use a GPRS Tunneling Protocol (GIP) or an Information Centric Networking (ICN) protocol; an N6 interface between the user control plane portion 150 and the external network 30 (e.g., a packet data network), an N9 interface between user plane instances (e.g., an intermediate user plane and a session anchor user plane) and where the interface may use a GPRS Tunneling Protocol (GTP) or an Information Centric Networking (ICN) protocol; a S4 interface (not shown) between a UE device 102 with 2G access or 3G access and the PGW for control and mobility support and, in some cases, user plane tunneling; and a S12 interface (not shown) between the E-UTRAN portion 110 (e g, UE device 102) and the SGW for user plane tunneling as an operator configuration option. Other types of communication networks (e.g., 3G, 5G, etc.) may include other user plane interfaces besides the ones depicted in FIG. 1 for the network 100.

Referring to FIG. 1, in some examples, the user plane portion 150 includes one or more user plane instances 152, 152a-n Each user plane instance 152 may refer to an infrastructure site (e.g., shown as sites 1-n) where computing resources may reside (e.g., hardware such as data processing hardware or memory hardware). By having different sites, the edge network 140 of the packet core network 120 may capitalize on locations near endpoints such as UEs 102 that may support user plane functions and/or control plane functions With service instances closer to the location of an endpoint, data functions (e.g., by the user plane portion 150) and data control functions (e.g., by the control plane portion 160) may occur at a rate to minimize latency and meet endpoint demand/access patterns. Although the network 100 of FIG. 1 depicts a single site (e.g., site 0) for the control plane portion 160, the control plane portion 160 may have multiple control plane instances 166 occurring at one or more sites. Since, generally speaking, a UE 102 is served by a single control plane instance 166, the network 100 of FIG. 1 depicts a single control plane site for simplicity, but the packet core network 120 may include other sites hosting control plane instances 166 (not shown) that were not selected in this particular example to support the UE 102. In some configurations, the user plane portion 150 and the control plane portion 160 share one or more sites that support their respective functionalities.

The control plane portion 160 is responsible for controlling and supporting user plane functions with control plane protocols (e.g., GTP-C, Gx, Gy, Gz). Particularly, the control plane portion 160 controls E-UTRAN access connections (e.g., attaching and detaching from the E-UTRAN portion 106 of the network 100), controls attributes of an established network access connection (e.g., an activation of an IP address), controls routing paths of an established network connection (e.g., to support user mobility), controls the processing of packets by various rules (e g, packet detections rules, packet forwarding rules, quality of service enforcement rules, and/or usage reporting rules), and/or controls an assignment of network resources based on demands to the network 100 (e.g., by a user of a UE device 102). The control plane portion 160 may interface with multiple user plane instances (e.g., user plane instances 152a-n). Generally, a IE 102 is served by a single control plane portion 160 although multiple user plane instances 152 may be selected for different types of connections or functions. Some interfaces specific to the control plane portion 160 (e.g., shown in dotted lines between network elements), are as follows: a S1-MME interface between the base station 104 and the MME 132 that guarantees delivery of signaling messages; a S3 interface (not shown) between the SGSN and the MME 132 that enables user/bearer information exchange for inter 3GPP access network mobility in idle and/or active states; a S5/S8 interface (not shown) between the SGW-C/U1 and the PGW-C/U where the S5 interface is used in a non-roaming scenario to serve relocation based on UE device 102 mobility and to connect to a non-collocated gateway of a PDN while the S8 interface connects to public land mobile networks (PLMN); a Sxa/Sxb interface between the user plane portion 150 and the control plane portion 160 that uses a Packet Forwarding Control Plane (PFCP) protocol, an S10 interface (not shown) that coordinates handovers between NIMEs 132; a S11 interface between the MME 132 and the control plane portion 160 for transferring signal messages, a S6a interface (not shown) between the MME 132 and the HSS that enables transfer of subscription and authentication data related to user access; a S6d interface (not shown) between the HSS and the SGSN that also enables transfer of subscription and authentication data related to user access; and a S13 interface (not shown) that supports a UE device 102 identity check. Other types of communication networks (e.g., 3G, 5G, etc.) may include other control plane interfaces besides the ones depicted in FIG. 1 for the network 100.

When a particular UE device 102 connects to the network 100, one or more control messages are sent among the various network elements (e.g., between the network elements of the evolved packet core 120 and the E-UTRAN portion 110). For instance, the base station 104 sends a control message to the MME 132 indicating that a new UE device 102 is attempting to connect to the network 100. As another example, the SPGW sends a control message to the MME 132 indicating that data from the external network 30 has arrived for a particular UE device 102 and that the UE device 102 needs to establish tunnels in order to accept the waiting data. The control plane interfaces may transmit such control messages using control plane protocols, such as a general packet radio service tunneling control (GTP-C) protocol or a Diameter protocol. The type of protocol used to transmit a control message 128 may depend on the interface. For instance, the S3, S5/S8, and S10 interfaces use GTP-C protocol while the S11, S6a, S6d, and S13 interfaces use Diameter protocol.

The MME/AMF 132 is a key control-node for the network 100. The MME/AMF 132 manages sessions and states and authenticates and tracks a UE device 102 across the network 100. For instance, the MME/AMF 132 may perform various functions such as, but not limited to, control of signaling and security for a Non Access Stratum (NAS), authentication and mobility management of UE devices 102, selection of gateways for UE devices 102, and bearer management functions.

The PCRF/PCF 134 is a node responsible for real-time policy rules and charging in the packet core network 120. In some examples, the PCRF/PCF 134 is configured to access subscriber databases (i.e., UE device users) to make policy decisions. Quality of service management may be controlled by dynamic policy interactions between the PCRF/PCF 134 and a network gateway device (e.g., a PGW, SGW or SPGW). Signaling by the PCRF/PCF 134 may establish or modify attributes of an EPS bearer (i.e., a virtual connection between the UE device 102 and the network gateway device). In some configurations, such as voice over LTE (VoLTE), the PCRF 134 allocates network resources for establishing calls and distributing requested bandwidth to a call bearer with configured attributes.

The SGW (e.g., shown as a separate network element with respect to the control plane portion 160, but integrated with the PGW in the user plane portion 150) performs various functions related to IP data transfer for user devices 102, such as data routing and forwarding, as well as mobility anchoring. The SGW may perform functions such as buffering, routing, and forwarding of data packets for mobile devices 102. Similarly, the PGW (i.e., network gateway device) performs various functions such as, but not limited to, internet protocol (IP) address allocation, maintenance of data connectivity for UE devices 102, packet filtering for UE devices 102, service level gating control and rate enforcement, dynamic host configuration protocol (DHCP) functions for clients and servers, and gateway general packet radio service (GGSN) functionality.

The SMF of the control plane portion 160 performs functionality related to session management (SM) and IP address management. For instance, the SMF performs session establishment, session modification, and/or session release between user plane functions and RAN node (e.g., base station 104). The SMF also is configured to select and to control user plane functions (e.g., traffic steering to route traffic to its proper destination), to terminate interfaces towards the PCF, to collect charging data and to support charging interfaces, to initiate RAN node specific session management information, and to support roaming functionality. With regard to IP address management, the SMF is configured to allocate a UE IP address and thereafter manage that UE IP address. This may include authorization functions for the IP address.

The HSS (not shown) refers to a database of all UE devices 102 that includes all UE device user data. Generally, the HSS is responsible for authentication for call and session setup. In other words, the HSS is configured to transfer subscription and authentication data for user access and UE context authentication. The HSS interacts with the MME 132 to authenticate the UE device 102 and/or UE device user. The MME communicates with the HSS on the PLMN using Diameter protocol (e.g., via the S6a interface).

In some implementations, the packet core network 120 includes a user plane selector 200 and/or a control plane selector 300. Each selector 200, 300 is configured to select a service instance for a communication session between a UE 102 and the packet core network 120. Here, the user plane selector 200 is configured to select a user plane instance 152 from one or more user plane instance candidates 212 (e.g., shown in FIGS. 2A-2E) available to the packet core network 120 to perform the user plane functions (e.g., data packet processing) during the communication session between a UE 102 and the packet core network 120. Similarly, the control plane selector 300 is configured to select a control plane instance 166 from one or more control plane instance candidates 312 (e.g., shown in FIGS. 3A-3E) available to the packet core network 120 to perform control plane functions (e.g., data packet routing) during the communication session between a UE 102 and the packet core network 120.

When the UE 102 decides to use the data packets services of the network 100 (e.g., for cellular communication or to support the use of various computing-based applications), the UE 102 initiates a session set-up request (e.g., also referred to as a request R). The UE 102 sends this session set-up request to a base station 104 (e.g., an eNB/gNB) within the geographical region of the UE 102 (e.g., the coverage area $104_{area}$). The base station 104 then selects a MME/AMF 132 of the packet core network 120 as a network control node to manage the communication session for the UE 102. Generally, the base station 104 selects a MME/AMF 132 of a network 100 based on its own load balancing techniques. Once the base station 104 selects the MME/AMF 132 in response to the set-up request, the MME/AMF 132 is configured to consult a Domain name Service (DNS) to select a SPGW/SMF virtual 11 (VIP) address for the UE 102. The VIP is communicated to a network operator (e.g., by advertising from a Top Of Rack (TOR) switch) and a control plane portion 160 (e.g., a front end control plane portion 164) is selected for the communication session (e.g., by the TOR with a hashing function). With a selected front end control plane portion 164 (e.g., shown as the front end control plane portion 164 of site 0), the front end control plane portion 164 works with the control plane selector 300 to discover a backend control plane portion 162 for the communication session (e.g., a control plane instance 166). The backend plane portion 162 for a particular control plane instance 166 is configured to process the initial session set-up message of the session setup request R. Once the control plane portion 160 performs protocol processing to setup the UE session, the control plane portion 160 selects a user plane instance 152 to perform the user plane functions of the user plane portion 150. Here, in order for the control plane portion 160 to select the user plane instance 152, the control plane portion 160 consults with the user plane selector 200. The user plane selector 200 either passes a selection recommendation or may be used to actually select one of the available user plane instances 152a-n With the service instances 152, 166 established for the session of the UE 102, the control plane portion 160 programs tunnel parameters and provides the UE 102 with UE IP addresses (e.g., IPv4/IPv6 addresses). The control plane portion 160 is also responsible for maintaining the established association between an external network 30 (e.g., packet data network) and the selected user plane instance 152. At this point, the control plane portion 160 may also respond to the mobility manager (e.g., the MME/AMF 132) to relay that the session has been established with service instances 152, 166 and also to establish a RAN-side data path (e.g., a S1-U interface tunnel). After establishment of the session with the user plane instance 152, the control plane portion 160 routes data (e.g., messages or other packets of information) through the selected user plane instance 152 for the established connection between the UE 102 and the external network 30.

In some implementations, the selectors 200, 300 include hardware (e.g., data processing hardware 204, 304 and memory hardware 206, 306) as computing resources to perform the functions of the selectors 200, 300. In some examples, this hardware may be specific to the selector(s) 200, 300 or refer to processing resources of the packet core network 120 (e.g., the edge network 140) shared with the selector(s) 200, 300. In some configurations, the selector(s) 200, 300 are co-located with service instances 152, 166 (e.g., reside at one or more sites with the user plane portion 150 and/or the control plane portion 160) or in a centralized location capable of communicating the recommendations and/or selections of the selector(s) 200, 300 to the appropriate network elements in order to establish the service instances 152, 166.

Referring to FIGS. 2A-2E, the user plane selector 200 is configured to recommend or to select a user plane instance 152 based on a request R to establish a communication session (e.g., between a UE 102 and an external network 30). The user plane selector 200 generally includes an identifier 210 and an analyzer 220. The identifier 210 is configured to identify a plurality of user plane instance candidates 212. A user plane instance candidate 212 refers to a user plane instance 152 that is capable of communicating with a control plane instance 166 established for a communication session. In other words, the user plane instance candidate 212 has to be reachable by the control plane portion 160 such that the control plane portion 160 can route data packets accordingly through the user plane instance candidate 212, if selected.

In FIGS. 2A-2E, the identifier 210 identifies each site (e.g., sites 1-n) of the user plane portion 150 as a user plane instance candidate 212a-n. For each user plane instance candidate 212, the identifier 210 determines one or more selection parameters 114, $114_{1-i}$. Here, i corresponds to a number of types of selection parameters 114 that may be determined or obtained by the identifier 210. The selection parameters 114 generally refer to network performance metrics. In some configurations, each RAN node (e.g., base station 104) maintains a number of key performance indicators (KPIs) 112 that correspond to communication-based metrics that are collected, or generally quantified and stored, to monitor network performance. When a base station 104 receives the request R from the UE 102, the base station 104 is also configured to communicate its KPIs 112 to the packet core network 120 (e.g., to the selector 200). In some implementations, the selector 200 may periodically stream or obtain KPIs 112 from one or more base nodes 104 of the network 100 and determine the parameters 114 at the time of receipt or at the time of identification. In some examples, the base station 104 communicates only a subset of the KPIs 112 (e.g., the selection parameter(s) 114) to the packet core network 120. Although the selection parameters 114 may refer to any network performance metric that may be used by the selector 200 to optimize user plane instance selection, some examples of selection parameters 114 include a base station node IP address (eNB/gNB-IP), an identifier or number of external network(s) 30, a GTP-U latency, transport control protocol (TCP) retransmissions, and/or a time of day (ToD).

In some examples, the identifier 210 determines the one or more selection parameters 114 for each candidate 212 at the selector 200. In other words, the base station 104 has previously gathered or is gathering KPIs that correspond to a particular user plane instance 152. When the identifier 210 receives or determines the selection parameters 114 based on the KPIs 112, the identifier 210 associates the selection parameters 114 with its specific user plane instance 152. In some configurations, the identifier 210 associates the selection parameters 114 with the user plane instance 152 prior to identifying the user plane instance 152 as a user plane instance candidate 212. In this configuration, the identifier 210 may be configured to perform an initial filtering of user plane instances 152 by identifying only user plane instances 152 as user plane instance candidates 212 when the user plane instances 152 satisfy one or more selection parameter thresholds.

The analyzer 220 is configured to select one of the plurality of user plane instance candidates 212a-n to fulfill the request R for the user plane instance 152 from the control plane portion 160. Here, the analyzer 220 receives the candidates 212 from the identifier 210 and generates a selection 202 (e.g., shown as a dotted box around a particular candidate 214) that selects or recommends a user plane instance candidate 212 as the user plane instance 152 to fulfill the request R. As shown in FIGS. 2A-2E, the analyzer 220 may perform the selection 202 (or recommendation) using a few different selection approaches. In either approach, the analyzer 220 generally bases the selection 202 on the selection parameter(s) 114a-n associated with the candidates 212.

Figure 2A:
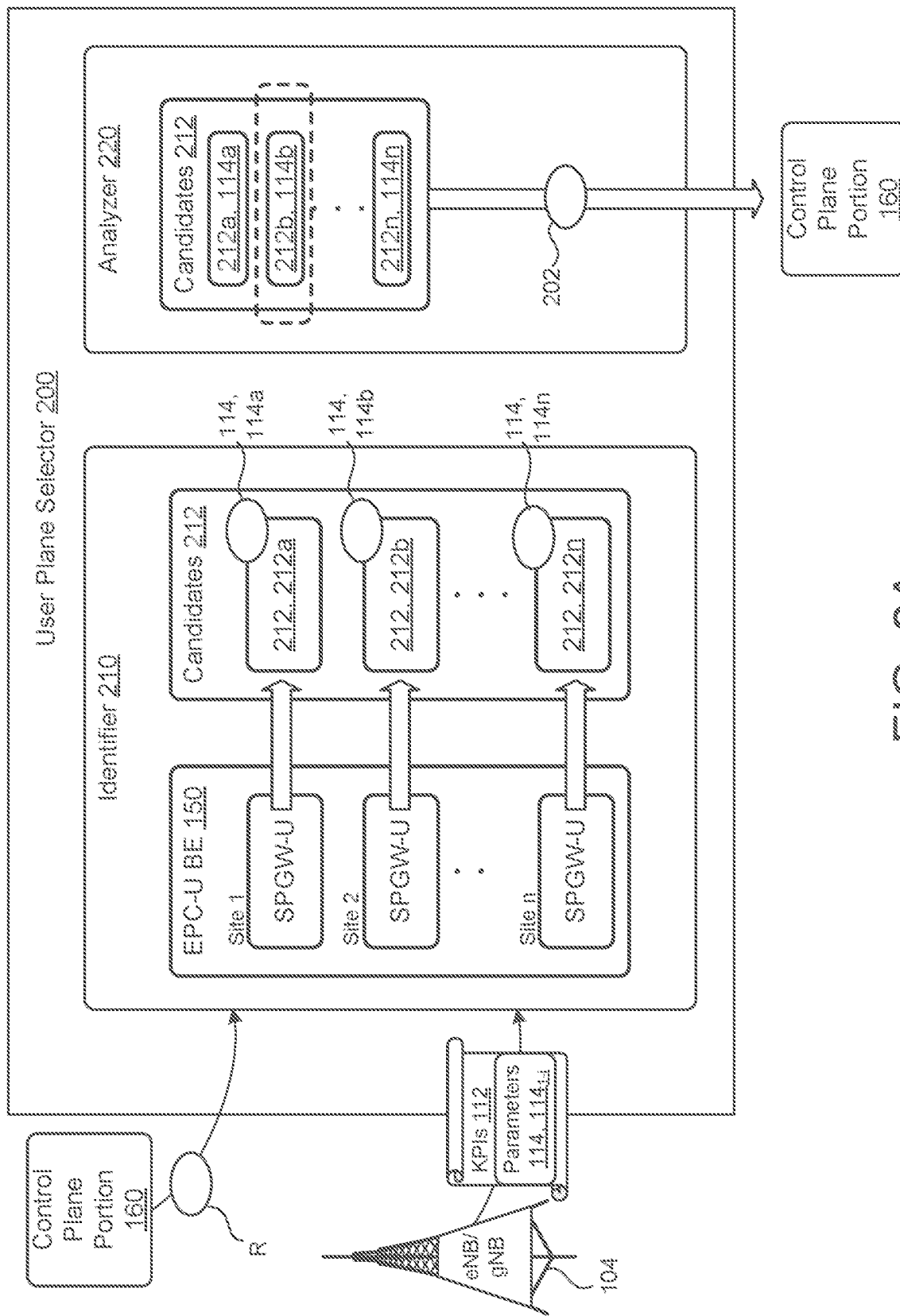
FIGS. 2A-2E are schematic views of example user plane selectors for the communication network of FIG. 1.
Figure 2B:
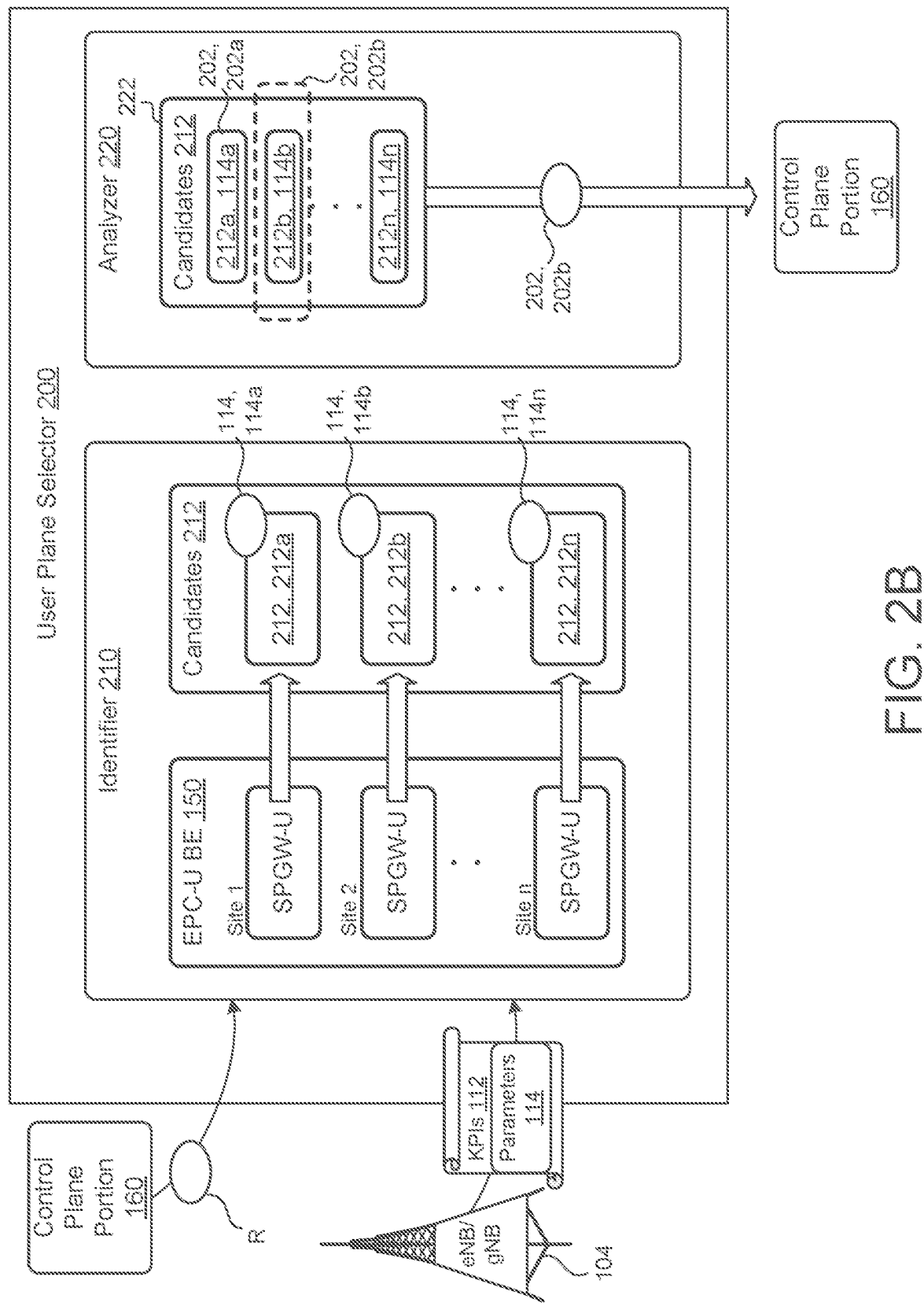
Figure 2C:
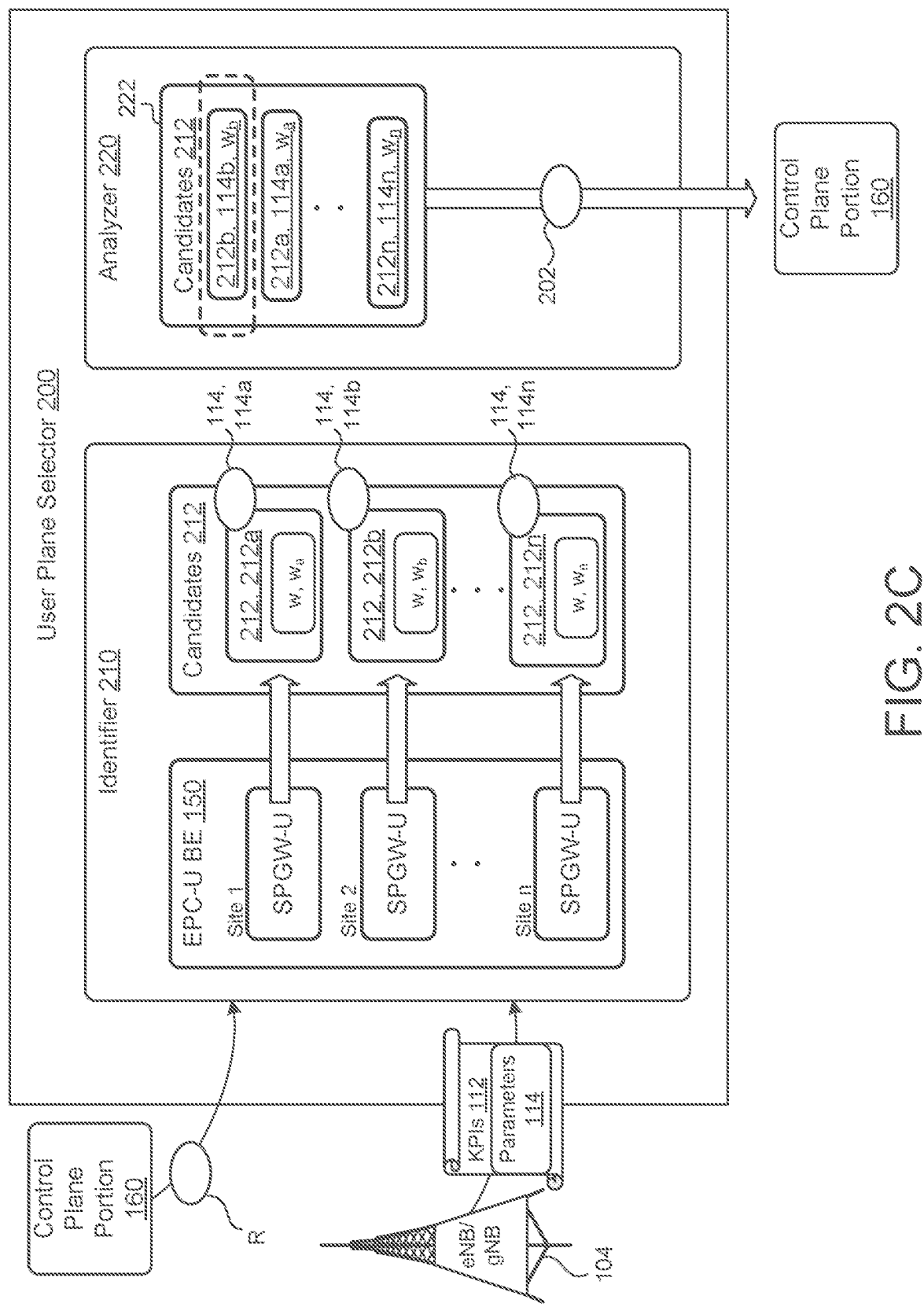

Referring to FIGS. 2B and 2C, the analyzer 220 may place the candidates 212 in a particular order (e.g., shown as a list 222) and select the candidate 212 as the selection 202 based on this order. In one approach, as shown in FIG. 2B, the analyzer 220 generates a list 222 of candidates 212 and is configured to select the candidate 212 based on a round robin approach. In other words, similar to round robin scheduling of computing resources, the analyzer 220 performs the selection 202 by cycling through each candidate 212 on the list 222 in order. For instance, the analyzer 220 selects the first candidate 212a on the list 222 as a first selection 202, 202a when it receives a first request R. The analyzer 220 then sequentially selects the second candidate 212b on the list 222 as a second selection 202, 202b when it receives a subsequent request R since the candidate 212 on the list 222 before it (e.g., the first candidate 212a) has already been previously selected in a prior session. In this manner, the analyzer 220 equally distributes instances 152 based on the previous selection 202. This approach may help balance the load (e.g., at particular network sites) by rotating the selection 202 such that the same candidate 212 or set of candidates 212 is not routinely selected causing underutilization of other feasible candidates 212. In other words, although a user plane instance 152 or site with the ability to host multiple user planes instances 152 may appear as though it is the best candidate 212 based on, for example, the location of the UE 102, if multiple UEs 102 near that site are requesting service instances, the computing resources at a site may become taxed due to poor distribution of instances 152 behalf of the selector 200 (e.g., even though other sub-optimal, but acceptable instances are available to these UEs 102).

Referring to FIG. 2C, when the analyzer 220 orders the candidates 212 (e.g., in the list 222), the analyzer 220 may associate a weight w with a candidate 212. In some examples, the weight w refers to a classification of the one or more selection parameters 114 associated with the candidate 212. In other words, the identifier 210 or the analyzer 220 may assign a weight w to the candidate based on a single selection parameter 114 of the candidate 212 or more than one selection parameter 114 of the candidate 212. In some examples, the weight w may refer to a score assigned to each candidate 212 as a function of its selection parameter(s) 114. With the weights w, $w_{a-n}$ assigned to each candidate 212, the analyzer 220 may generate the list 222 in an order that ranks the candidates 212 by weight w. When the list 222 includes weights w for the candidates 212, the analyzer 220 generate the selection 202 of a candidate 212 based on a candidate with the greatest or lowest weight (e.g., depending on the weight function). Accordingly, when the analyzer 220 orders the list 222 by weight w, the analyzer 220 may be configured to select the top candidate 212 on the list 222.

Figure 2D:
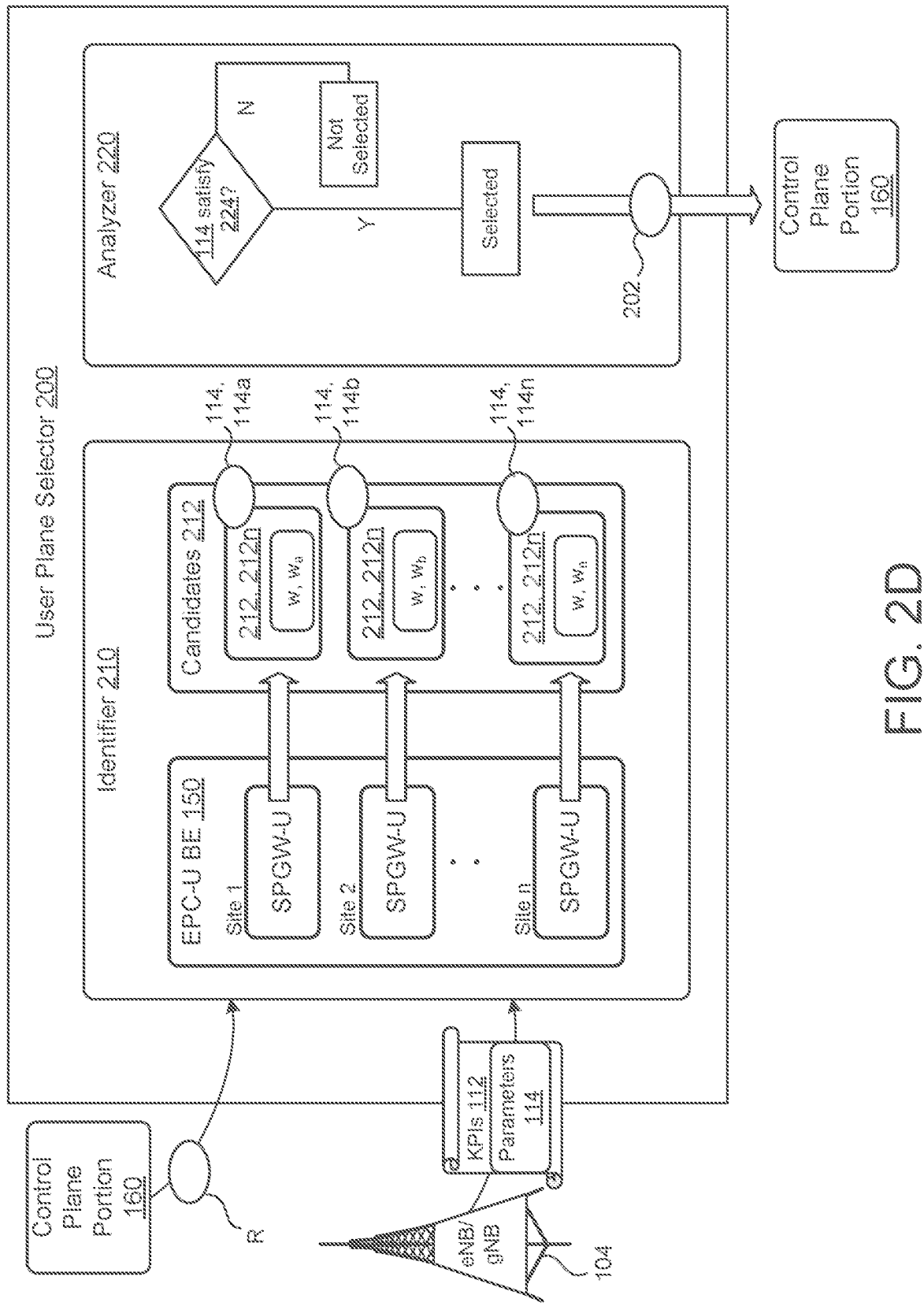

Additionally or alternatively to the weight w applied to each candidate 212, FIG. 2D illustrates that the analyzer 220 may use an approach where the selection 202 is based on selection criteria 224. The selection criteria 224 generally refers to a rule-based approach where the analyzer 220 uses one or more rules to select a candidate 212. In some examples, the selection criteria 224 refers to a rule to select a minima or maxima of one or more of the selection parameters 114. In other examples, the selection criteria 224 includes multiple rules (e.g., compounding rules) such that the analyzer 220 uses its processing to determine a candidate 212 that represents the intersection of each rule or the next best alternative. For instance, with several selection parameters 114, the rules may specify that the candidate 212 should have at least a particular latency measurement (i.e., a latency threshold) at a particular time of day. In this instance, the analyzer 220 determines a candidate 212 that satisfies each of these rules (or the next best alternative), and selects such candidate 212 as the selection 202. In some configurations, with compound rules as the selection criteria 224, each rule may be assigned priority. For example, the analyzer 220 may prioritize a candidate's average latency characteristics rather than confine itself to latency measurements at a particular time of day. In order to load balance resources of the network 100 and/or be latency-sensitive, the selection criteria 224 may often include rules that specify thresholds or values that latency measurements (e.g., GTP-U latency) and/or load measurement should satisfy in order to be selected by the analyzer 220.

Figure 2E:
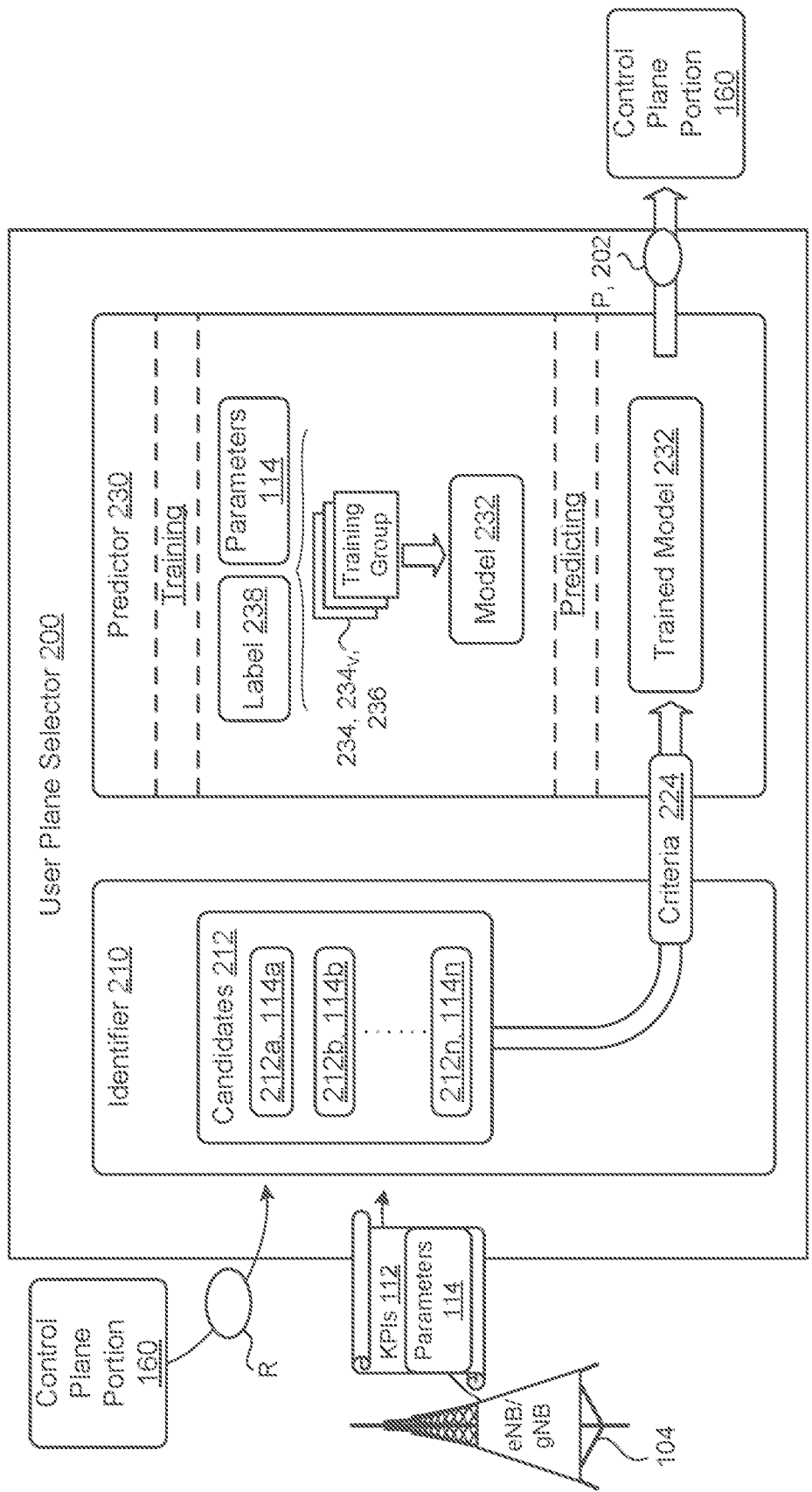

FIG. 2E depicts the selector 200 using a machine teaming approach to user plane instance selection. In this approach, the selector 200 forms the selection 202 of the user plane instance 152 based on a prediction P from a predictive model 232 at a predictor 230. In some examples, the predictor 230 replaces the analyzer 220. Yet in other examples, the analyzer 220 (although not shown) may still be implemented by the selector 200 to determine that the prediction P actually satisfies selection criteria 224. The predictor 230 generally includes two stages, a first stage (e.g., a training stage) and a second stage (e.g., inference stage). In the first stage, the predictor 230 trains the model 232 to be able to predict a user plane instance 152 that satisfies the selection criteria 224. In order to train the predictor 230, the predictor 230 generates training groups 234. Each training group 234 includes a set of training user plane instances 236 and corresponding selection parameter(s) 114 to simulate a set of user plane instance candidates 212 that the selector 200 would select from during operation. Here, each training user plane instance 236 in a training group 234 includes a selection criteria label 238. The selection criteria label 238 indicates whether or not a training user plane instance 236 with its parameters 114 satisfies the selection criteria 224. By including the selection criteria label 238, the selection criterial label 238 functions as a ground truth while training the model 232 with the training groups 234. With ground truths, the predictor 230 learns which candidates 212 associated with particular selection parameter(s) 114 correspond to which label 238. In some examples, to determine whether the model 232 has been sufficiently trained, a validation training group 234, $234_V$ is passed to the model 232 to identify whether the model 232 accurately identifies the correct labels 238 for the validation training group $234_V$. In a second stage (e.g., inference), after the predictor 230 is trained, the predictor 230 no longer uses training user plane instances 236 with both parameters 114 and a label 238. Instead, the identifier 210 communicates one or more candidates 212, their parameter(s) 114, and the selection criteria 224 to the trained model 232 for the trained model 232 to generate a prediction P of the label 238 for each candidate 212. Here, the predictor 230 forms the selection 202 by using a label 238 to predicts that a candidate 212 from among the candidates 212 satisfies the selection criteria 224.

In some examples, once training is complete (e.g., after validation), the predictor 230 tests the model 232 on small percentage of new incoming requests R to predict the user plane instance candidate 212 for different selection criteria 224. Some selection criteria 224 may try to identify the best user plane instance candidate 212 to use with a particular network configuration (e.g., a particular UE 102, base station 104, or some combination of network elements that connect to an external network 30). For instance, the selection criteria 224 includes an identifier of the particular type of network configuration, such as a base station node internet protocol address (eNB/gNB-1P), an evolved Universal Mobile Telecommunications Service Terrestrial Radio Access Network cell global identifier (ECGI), an International Mobile Equipment Identity (IMEI), or an International Mobile Subscriber Identity (IMSI). The model 232 may use one or more of these identifiers with other selection criteria 224 such as, a latency measurement (e.g., the lowest latency) or a rate of TCP retransmissions (e.g., the lowest rate). In other words, the selection criteria 224 may compound different types of criteria. A first type of criteria may be network performance-based criteria (e.g., the lowest latency). A second type of criteria may be network device-based criteria (e.g., use the identifiers for particular type of network elements or network configurations). A third type of criteria may be based on current conditions during a request R (e.g., time of day or a location of network equipment). To give an example of such compound selection criteria 224, the request R along with the selection criteria 224 may request the best user instance candidate 212 for a given packet core identifier (e.g., ECGI/eNB-IP or gNB-IP) at a particular time of day. Additionally, the selector 200 may want to fulfill this request R for any UE 102 based on the given packet core identifier and ToD or for a particular UE 102. With these types of compounding layers, the selection 202 of a user plane instance candidate 212 may be capable of varying degrees of granularity. In some configuration, when the predictor 230 tests the model 232 on a small percentage of new incoming requests R, the predictor 230 uses selection criteria 224 in an increasing order of granularity. For instance, the increasing order of granularity is (i) eNB/gNB-Ip, ToD, (ii) ECGI, ToD, (iii) IMEI, ECGI/eNB-IP or gNB-IP, ToD, (iv) IMSI, ECGI/eNB-IP or gNB-IP, ToD (e.g., when IMSI or hashed IMSI is available for use).

Referring to FIGS. 3A-3E, the control plane selector 300 is configured to recommend or to select a control plane instance 166 based on a request R to establish a communication session (e.g., between a UE 102 and an external network 30). The control plane selector 300 generally includes an identifier 310 and an analyzer 320. The identifier 310 is configured to identify a plurality of control plane instance candidates 312. A control plane instance candidate 312 refers to a control plane instance 166 that is configured to route packets for a UE 102 during a communication session. In other words, the control plane instance candidate 312 is configured to serve an entirety of a MME/AMF IP space, if selected.

In FIGS. 3A-3E, each site (e.g., sites 1-n) of the control plane portion 160 is shown to be identified as a control plane instance candidate 312a-n by the identifier 310. For each control plane instance candidate 312, the identifier 310 determines one or more selection parameters 138, $138_{1-i}$ (e.g., for the control plane functions these are also referred to as routing selection parameters 138). Here, i corresponds to a number of types of routing selection parameters 138 that may be determined or obtained by the identifier 310. The routing selection parameters 138 generally refer to network performance metrics. In some configurations, each mobility manager (e.g., MME/AMF 132) maintains a number of key performance indicators (KPIs) 136 (also referred to as routing KPIs 136) that correspond to communication-based metrics that are collected, or generally quantified and stored, to monitor network performance (e.g., session routing performance). When a MME/AMF 132 receives the request R from the UE 102, the MME/AMF 132 is also configured to communicate its routing KPIs 136 to the packet core network 120 (e.g., to the selector 300). In some implementations, the selector 300 may periodically stream or obtain routing KPIs 136 from one or more mobility managers 132 of the network 100 and determine the routing parameters 138 at the time of receipt or at the time of identification. In some examples, the mobility manager 132 communicates only a subset of the routing KPIs 136 (e.g., the routing selection parameter(s) 138) to the packet core network 120. Although the routing selection parameters 138 may refer to any network performance metric that may be used by the selector 300 to optimize control plane instance selection, some examples of routing selection parameters 138 include a MME/AMF IP address, an identifier or number of external network(s) 30, a GTP-C latency, GTP-C retransmission count, and/or a time of day (ToD).

In some examples, the identifier 310 determines the one or more routing selection parameters 138 for each candidate 312 at the selector 300. In other words, the mobility manager 132 has previously gathered or is gathering routing KPIs 136 that correspond to particular control plane instance 166. When the identifier 310 receives or determines the routing selection parameters 138 based on the routing KPIs 136, the identifier 310 associates the routing selection parameters 138 with its specific control plane instance 166. In some configurations, the identifier 210 associates the routing selection parameters 138 with the control plane instance 166 prior to identifying the control plane instance 166 as a control plane instance candidate 312. In this configuration, the identifier 310 may be configured to perform an initial filtering of control plane instances 166 by identifying only control plane instances 166 that satisfy one or more routing selection parameter thresholds as control plane instance candidates 312.

The analyzer 320 is configured to select one of the plurality of control plane instance candidates 312a-n to fulfill the request R for the control plane instance 166 from the session manager (e.g., the SMF from the front end control plane portion 164). Here, the analyzer 320 receives the candidates 312 from the identifier 310 and generates a selection 302 (e.g., shown as a dotted box around a particular candidate 312) that selects or recommends a control plane instance candidate 312 as the control plane instance 166 to fulfill the request R. As shown in FIGS. 3A-3E, the analyzer 320 may perform the selection 302 (or recommendation) using a few different selection approaches. In either approach, the analyzer 320 generally bases the selection 302 on the routing selection parameter(s) 138a-n associated with the candidates 312.

Figure 3A:
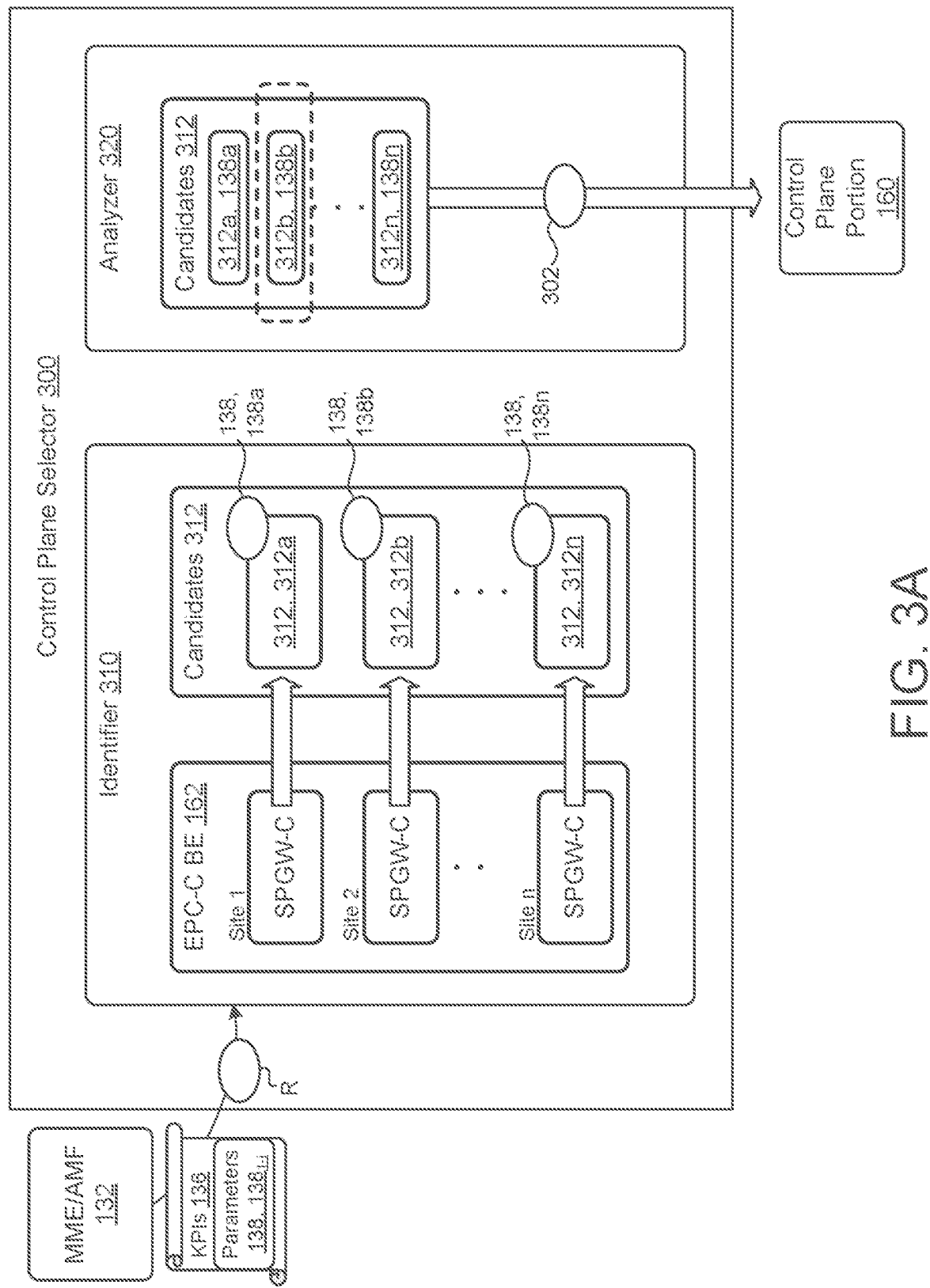
FIGS. 3A-3E are schematic views of example control plane selectors for the communications network of FIG. 1.
Figure 3B:
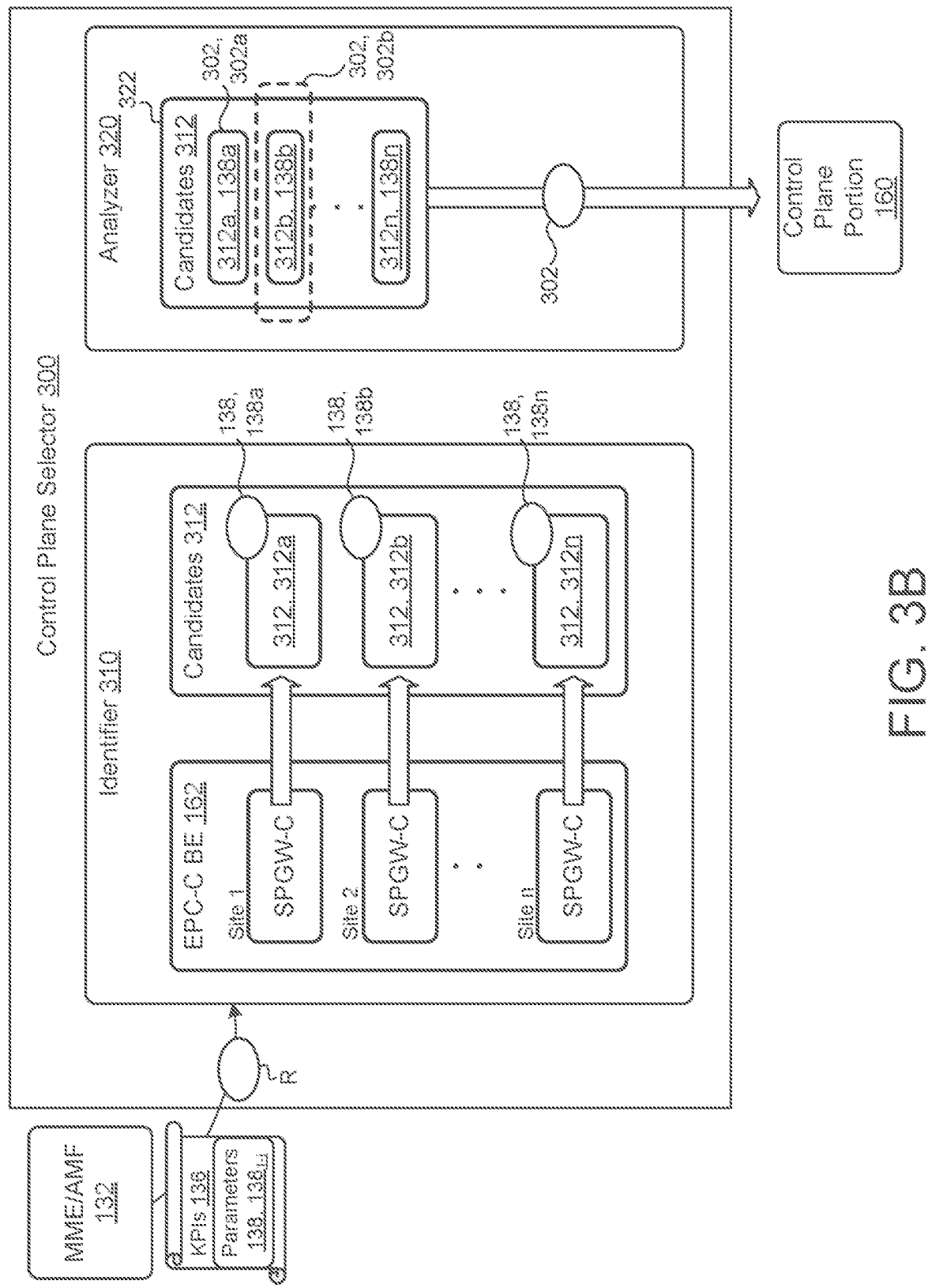
Figure 3C:
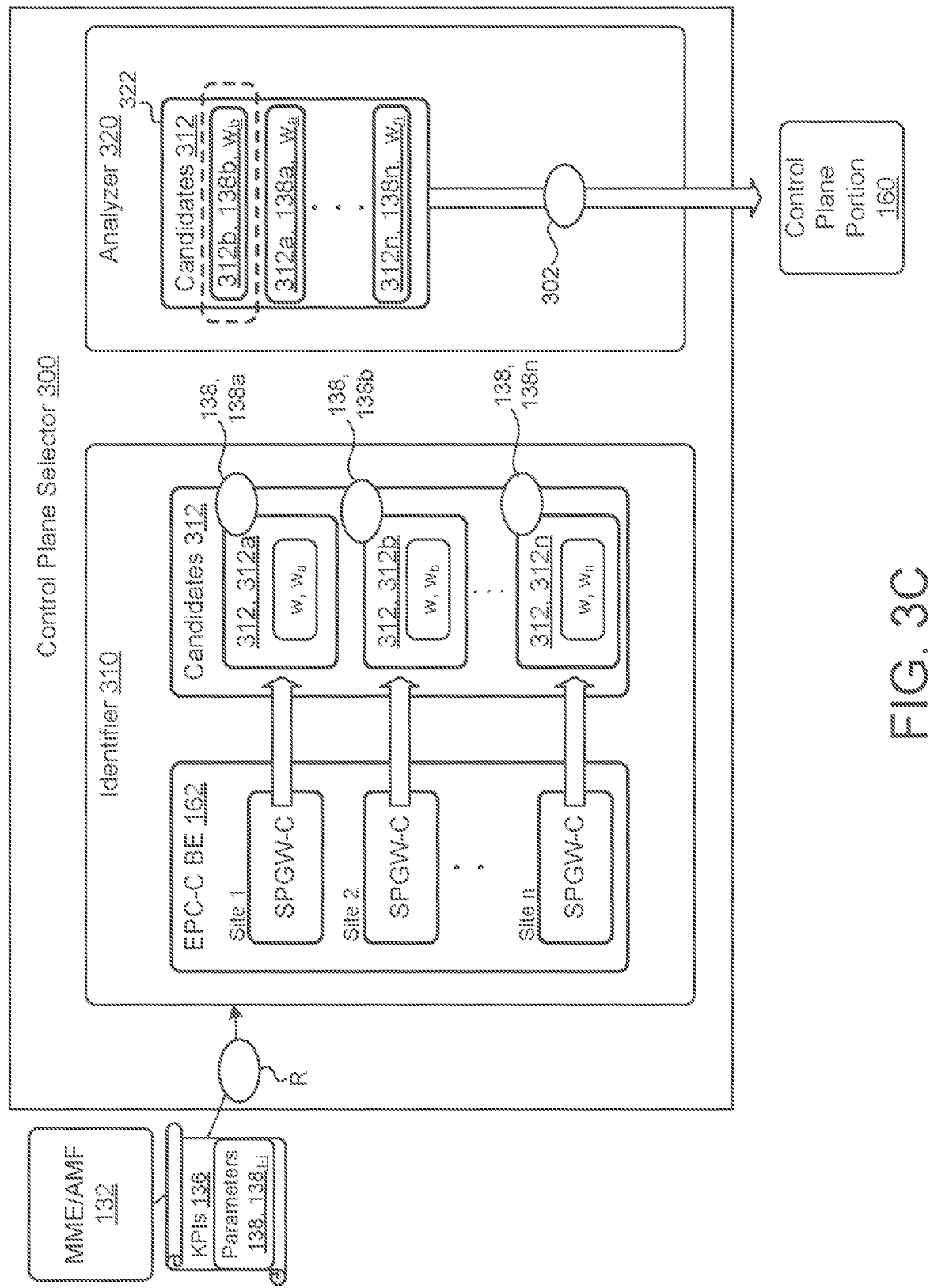

Referring to FIGS. 3B and 3C, the analyzer 320 may place the candidates 312 in a particular order (e.g., shown as a list 322) and select the candidate 312 as the selection 302 based on this order. In one approach, as shown in FIG. 3B, the analyzer 320 generates a list 322 of candidates 312 and is configured to select the candidate 312 based on a round robin approach. In other words, similar to round robin scheduling of computing resources, the analyzer 320 performs the selection 302 by cycling through each candidate 312 on the list 322 in order. For instance, when the analyzer 320 selects the first candidate 312a on the list 322 as a first selection 302, 302a when it receives a first request R, it then sequentially selects the second candidate 312b on the list 322 as a second selection 302, 302b when it receives a subsequent request R since the candidate 312 on the list 322 before it (e.g., the first candidate 312a) has already been previously selected in a prior session. In this manner, the analyzer 320 equally distributes instances 166 based on previous selection 302. This approach may help balance the load (e.g., at particular network sites) by rotating the selection 302 such that the same candidate 312 or set of candidates 312 is not routinely selected causing underutilization of other feasible candidates 312.

Referring to FIG. 3C, when the analyzer 320 orders the candidates 312 (e.g., in the list 322), the analyzer 320 may associate a weight w to a candidate 312. In some examples, the weight w refers to a classification of the one or more routing selection parameters 138 associated with the candidate 312. In other words, the identifier 310 or the analyzer 320 may assign a weight w to the candidate 312 based on a single routing selection parameter 138 of the candidate 312 or more than one routing selection parameter 138 of the candidate 312. In some examples, the weight w may refer to a score assigned to each candidate 312 as a function of its routing selection parameter(s) 138. With the weights w, $w_{a-n}$ assigned to each candidate 312, the analyzer 320 may generate the list 322 in an order that ranks the candidates 312 by weight w. When the list 322 includes weights w for the candidates 312, the analyzer 320 generate the selection 302 of a candidate 312 based on a candidate 312 with the greatest or lowest weight w (e.g., depending on the weight function). Accordingly, when the analyzer 320 orders the list 322 by weight w, the analyzer 320 may be configured to select the top candidate 312 on the list 322.

Figure 3D:
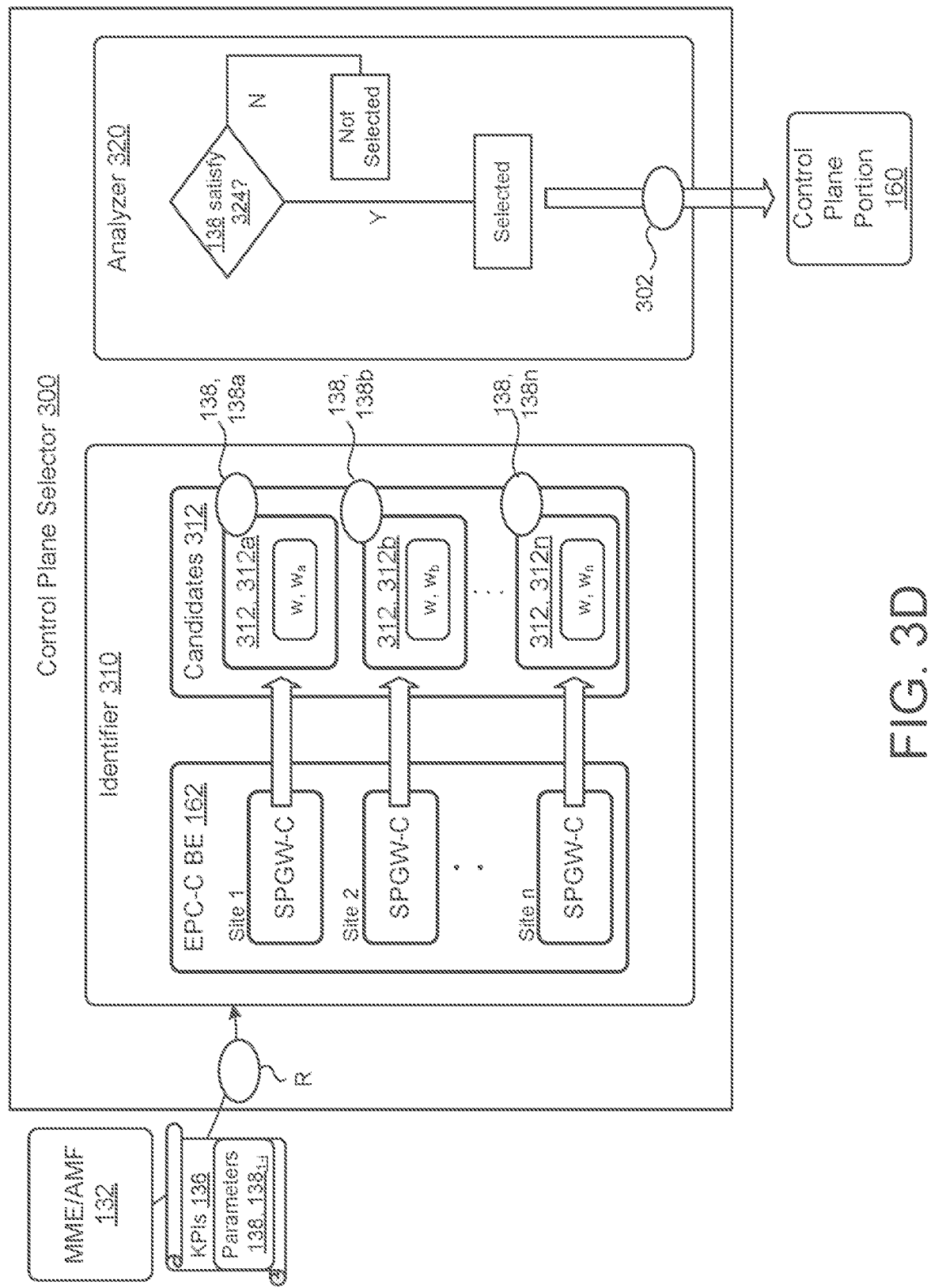

Additionally or alternatively to the weight w applied to each candidate 312, FIG. 3D illustrates that the analyzer 320 may use an approach where the selection 302 is based on selection criteria 324. The selection criteria 324, much like the selection criteria 224 of the user plane selector 200, generally refers to a rule-based approach where the analyzer 320 uses one or more rules to select a candidate 312. In some examples, the selection criteria 324 refers to a rule to select a minima or maxima of one or more of the routing selection parameters 138. In other examples, the selection criteria 324 includes multiple rules (e.g., compounding rules) such that the analyzer 320 uses its processing to determine a candidate 312 that represents the intersection of each rule or the next best alternative. For instance, with several routing selection parameters 138, the rules may specify that the candidate 312 should have at least a particular latency measurement (i.e., a latency threshold) at a particular time of day. In this instance, the analyzer 320 determines a candidate 312 that satisfies each of these rules (or the next best alternative), and selects such candidate 312 as the selection 302. In some configurations, with compound rules as the selection criteria 324, each rule may be assigned priority. For example, the analyzer 320 may prioritize a candidate's average latency characteristics rather than confine itself to latency measurements at a particular time of day. In order to load balance resources of the network 100 and/or be latency-sensitive, the selection criteria 324 may often include rules that specify thresholds or values that latency measurements and/or load measurement should satisfy in order to be selected by the analyzer 320.

Figure 3E:
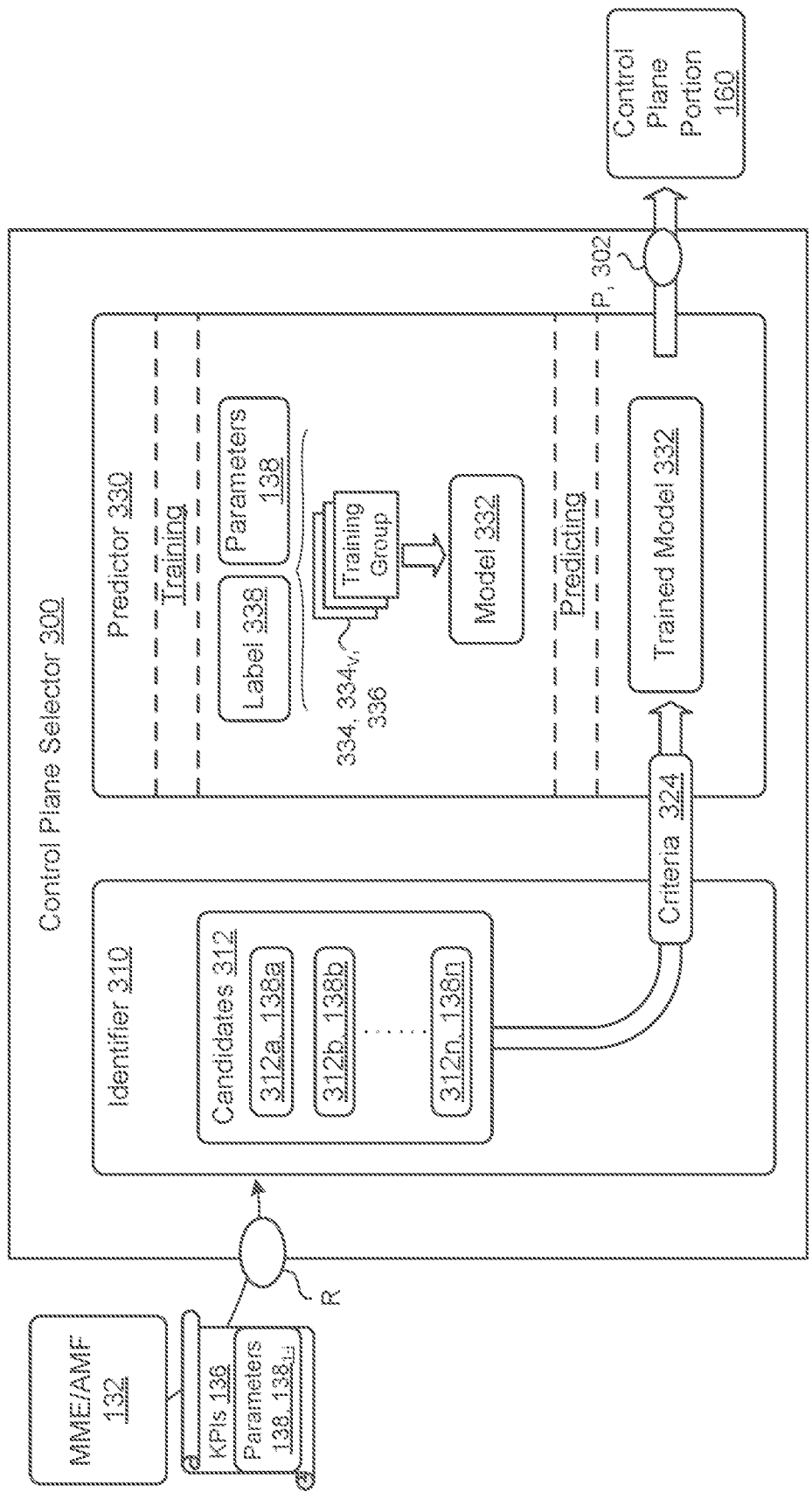

FIG. 3E depicts the selector 300 using a machine learning approach to control plane instance selection. In this approach, the selector 300 forms the selection 302 of the control plane instance 166 based on a prediction P from a predictive model 332 at a predictor 330. In some examples, the predictor 330 replaces the analyzer 320. Yet in other examples, the analyzer 320 (although not shown) may still be implemented by the selector 300 to determine that the prediction P actually satisfies selection criteria 324. The predictor 330 generally includes two stages, a first stage (e.g., a training stage) and a second stage (e.g., inference stage). In the first stage, the predictor 330 trains to be able to predict a control plane instance 166 that satisfies the selection criteria 324. In order to train the predictor 330, the predictor 330 generates training groups 334. Each training group 334 includes a set of training control plane instances 336 and corresponding routing selection parameter(s) 138 to simulate a set of control plane instance candidates 312 that the selector 300 would select from during operation. Here, each training control plane instance 336 in a training group 334 includes a selection criteria label 338. The selection criteria label 338 indicates whether or not a training control plane instance 336 with its routing parameters 138 satisfies the selection criteria 324. By including the selection criteria label 338, the selection criterial label 338 functions as a ground truth while training the model 332 with the training groups 334. With ground truths, the predictor 330 learns which candidates 312 associated with particular routing selection parameter(s) 138 correspond to which label 338. In some examples, to determine whether the model 332 has been sufficiently trained, the a validation training group 334, $334_V$ is passed to the model 332 to identify whether the model 332 accurately identifies the correct labels 338 for the validation training group $334_V$. In a second stage (e.g., inference), after the predictor 330 is trained, the predictor 330 no longer uses training user plane instances 336 with both routing parameters 138 and a label 338. Instead, the identifier 310 communicates one or more candidates 312, their routing parameter(s) 138, and the selection criteria 324 to the trained model 332 for the trained model 332 to generate a prediction P of the label 338 for each candidate 312. Here, the predictor 330 forms the selection 302 by using a label 338 that predicts that a candidate 312 from among the candidates 312 satisfies the selection criteria 324.

In some examples, once training is complete (e.g., after validation), the predictor 330 tests the model 332 on small percentage of new incoming requests R to predict the control plane instance candidate 312 for different selection criteria 324. Some selection criteria 324 that may be used try to identify the best control plane instance candidate 312 to use with a particular network configuration (e.g., a particular UE 102, session manager (e.g., SMF of the front end control plane portion 164), or some combination of network elements that connect to an external network 30). For instance, the selection criteria 324 includes an identifier of the particular type of network configuration, such as an identifier of the MME, an identifier of the AMF, an International Mobile Equipment Identity (IMEI), or an International Mobile Subscriber Identity (IMSI). The model 332 may use one or more of these identifiers with other selection criteria 324 such as, a latency measurement (e.g., the lowest latency) or a rate of GTP-C retransmissions (e.g., the lowest rate). In other words, the selection criteria 324 may compound different types of criteria. A first type of criteria may be network performance-based criteria (e.g., the lowest latency). A second type of criteria may be network device-based criteria (e.g., use the identifiers for particular type of network elements or network configurations). A third type of criteria may be based on current conditions during a request R (e.g., time of day or a location of network equipment). To give an example of such compound selection criteria 324, the request R along with the selection criteria 324 may request the best control instance candidate 312 for a given mobility manager identifier (e.g., MMF/AMF identifier) at a particular time of day. Additionally, the selector 300 may want to fulfill this request R for any UE 102 based on the given mobility manager identifier and ToD or for a particular UE 102. With these types of compounding layers, the selection 302 of a user plane instance candidate 312 may be capable of varying degrees of granularity. In some configuration, when the predictor 330 tests the model 332 on a small percentage of new incoming requests R, the predictor 330 uses selection criteria 324 in an increasing order of granularity. For instance, the increasing order of granularity is (i) MME/AMF, ToD, (ii) IMEI, MME/AMF, ToD, (iii) IMSI, MME/AMF, ToD (e.g., when IMSI or hashed IMSI is available for use).

Figure 4:
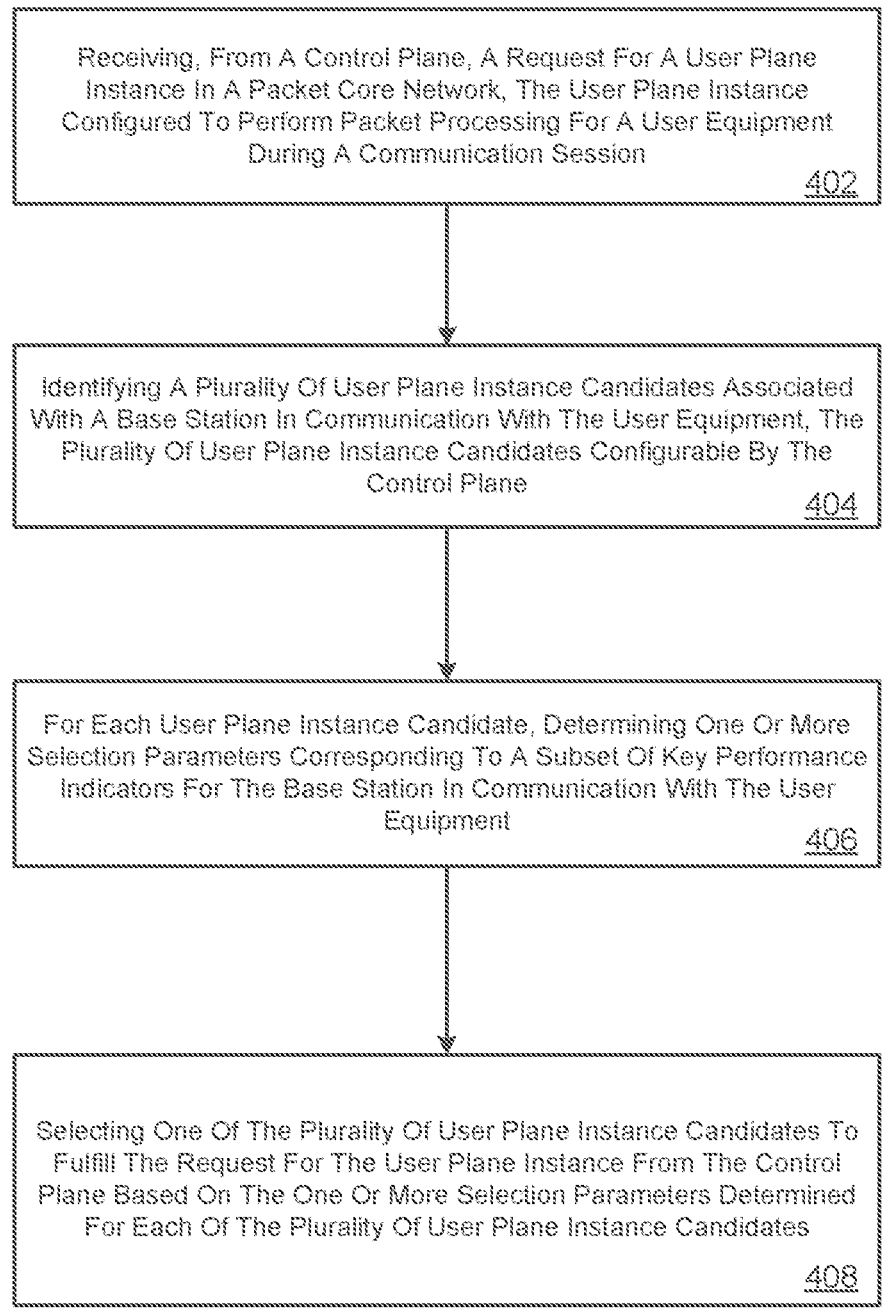
FIG. 4 is a flow chart of an example arrangement of operations for a method of selecting a user plane instance.

FIG. 4 is a flowchart of an example arrangement of operations for a method 400 of selecting a user plane instance 152. At operation 402, the method 400 receives, at data processing hardware 204, from a control plane 160, a request R for a user plane instance 152 in a packet core network 120. The user plane instance 152 is configured to perform packet processing for a user equipment 102 during a communication session. At operation 404, the method 400 identifies a plurality of user plane instance candidates 212 associated with a base station 104 in communication with the user equipment 102. The plurality of user plane instance candidates 212 is configurable by the control plane 160. For each user plane instance candidate, at operation 406, the method 400 determiners one or more selection parameters 114 corresponding to a subset of key performance indicators 112 for the base station 104 in communication with the user equipment 102. At operation 408, the method 400 selects one of the plurality of user plane instance candidates 212 to fulfill the request R for the user plane instance 152 from the control plane 160 based on the one or more selection parameters 114 determined for each of the plurality of user plane instance candidates 212.

Figure 5:
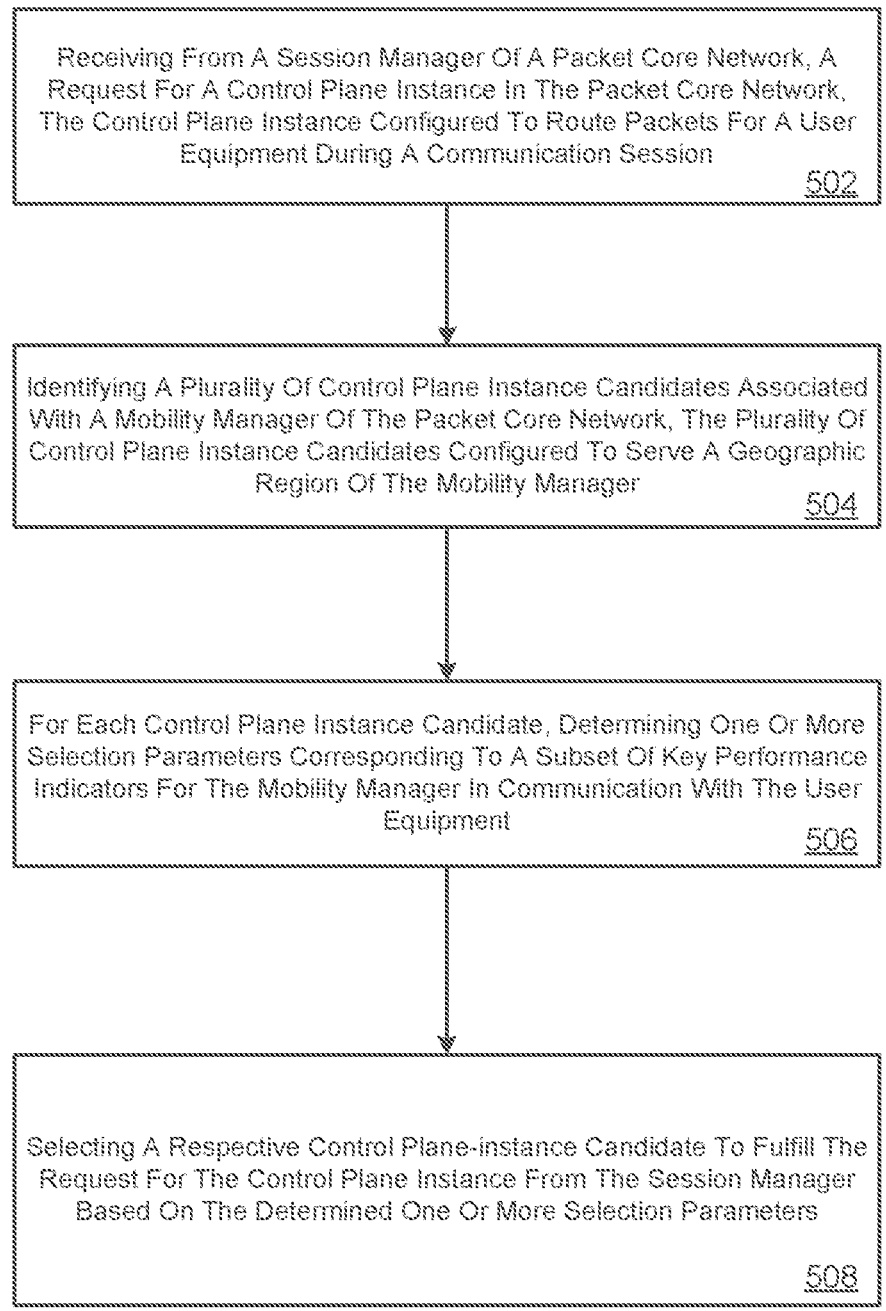
FIG. 5 is a flow chart of an example arrangement of operations for a method of selecting a control plane instance.

FIG. 5 is a flowchart of an example arrangement of operations for a method 500 of selecting a control plane instance 166. At operation 502, the method 500 receives, at data processing hardware 304, from a session manager 164 of a packet core network 120, a request R for a control plane instance 166b in the packet core network 120. The control plane instance 166 is configured to route packets for a user equipment 102 during a communication session. At operation 504, the method 500 identifies a plurality of control plane instance candidates 312 associated with a mobility manager 132 of the packet core network 120. The plurality of control plane instance candidates 312 is configured to serve a geographic region of the mobility manager 132. For each control plane instance candidate 312, at operation 506, the method 500 determines one or more selection parameters 138 corresponding to a subset of key performance indicators 136 for the mobility manager 132 in communication with the user equipment 102. At operation 508, the method 500 selects a respective control plane instance candidate 312 to fulfill the request R for the control plane instance 166 from the session manager 164 based on the determined one or more selection parameters 138.

Figure 6:
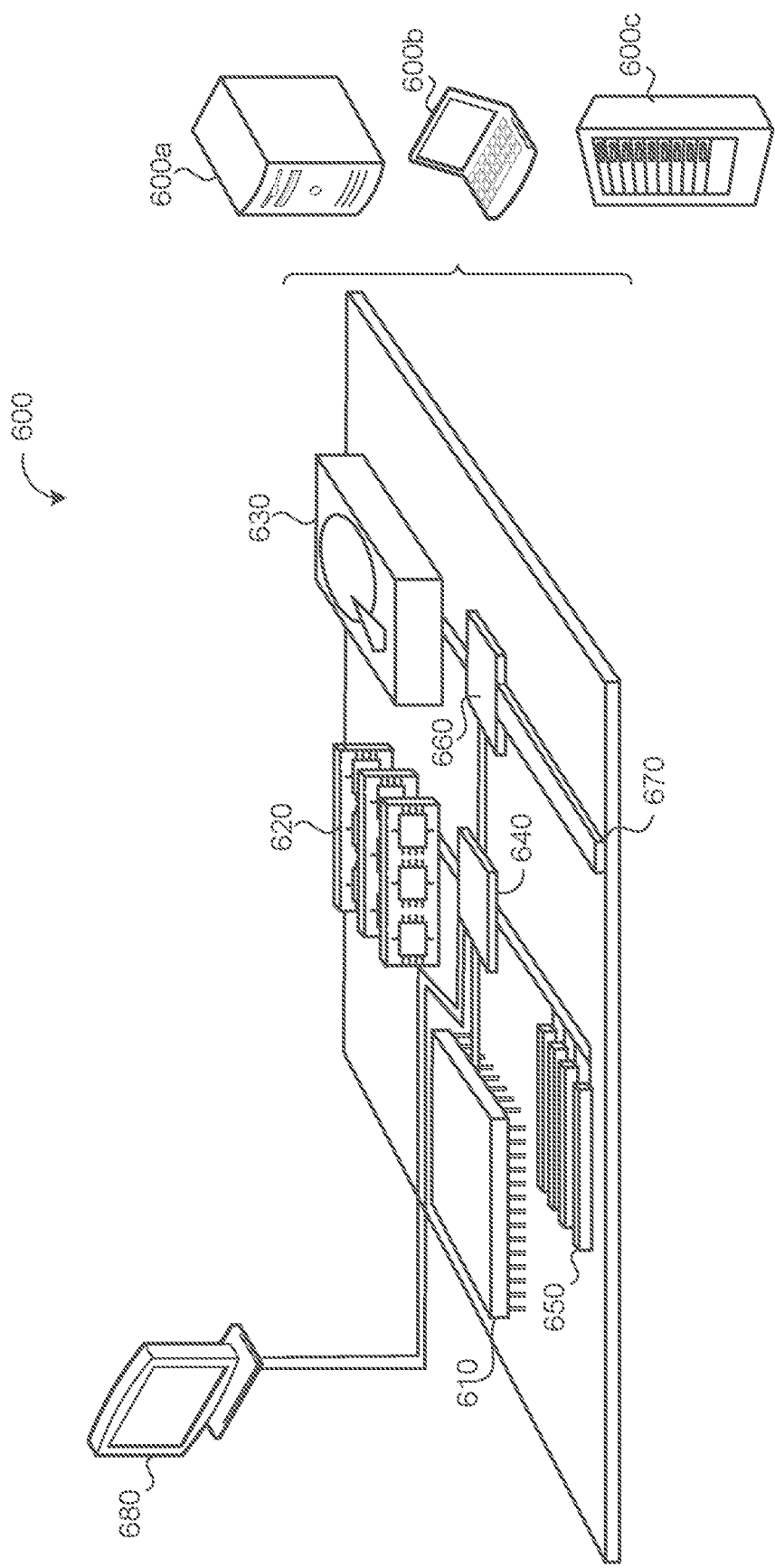
FIG. 6 is a schematic view of an example computing device that may be used to implement the systems and methods described herein.

FIG. 6 is schematic view of an example computing device 600 that may be used to implement the systems (e.g., the selectors 200, 300) and methods (e.g., method 400 and method 500) described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (e.g., data processing hardware 204, 304) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., memory hardware 206, 306) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, from a control plane, a request for a user plane instance in a packet core network, the user plane instance configured to perform packet processing for a user equipment during a communication session;
identifying, by the data processing hardware, a plurality of user plane instance candidates associated with a base station in communication with the user equipment, the plurality of user plane instance candidates configurable by the control plane;
for each user plane instance candidate, determining, by the data processing hardware, one or more selection parameters corresponding to a subset of key performance indicators for the base station in communication with the user equipment; and
selecting, by the data processing hardware, using a machine learning selection model, one of the plurality of user plane instance candidates to fulfill the request for the user plane instance from the control plane based on the one or more selection parameters determined for each of the plurality of user plane instance candidates, wherein the machine learning selection model is:
configured to receive the one or more selection parameters determined for each of the plurality of user plane instance candidates and a selection criteria; and
trained on a plurality of training groups, each training group comprising a plurality of training user plane instances, each training user plane instance in the corresponding training group associated with one or more corresponding selection parameters and a selection criteria label, the selection criteria label indicating whether or not the corresponding training user plane instances satisfy the selection criteria.

2. The method of claim 1, further comprising:
generating, by the data processing hardware, a list of user plane instance candidates based on the one or more selection parameters determined for each of the plurality of user plane instance candidates; and
wherein selecting the one of the plurality of user plane instance candidates to fulfill the request comprises sequentially selecting the user plane instance candidate from the list of user plane instance candidates based on a previously selected user plane instance from the list of user plane instance candidates.

3. The method of claim 1, further comprising:
assigning, by the data processing hardware, a corresponding weight to each user plane instance candidate of the plurality of user plane instance candidates, the corresponding weight representing the one or more selection parameters determined for the corresponding user plane instance candidate;
ranking, by the data processing hardware, the plurality of user plane instance candidates based on the corresponding weight to each user plane instance candidate of the plurality of user plane instance candidates, and
wherein selecting the one of the plurality of user plane instance candidates to fulfill the request comprises selecting the user plane instance candidate having a highest ranking as the one of the plurality of user plane instance candidates to fulfil the request for the user plane instance.

4. The method of claim 1, wherein selecting the one of the plurality of user plane instance candidates to fulfill the request comprises, determining, by the data processing hardware, that the one of the plurality of user plane instance candidates satisfies the selection criteria, the selection criteria corresponding to a minima or a maxima of the one or more selection parameters determined for each of the plurality of user plane instance candidates.

5. The method of claim 4, wherein:
one of the one or more selection parameters determined for each of the plurality of user plane instance candidates comprises a latency measurement associated with the corresponding user plane instance candidate; and
the selection criteria comprises a lowest one of the latency measurements associated with the plurality of user plane instance candidates.

6. The method of claim 4, wherein:
one of the one or more selection parameters determined for each of the plurality of user plane instance candidates comprises a load associated with the corresponding user plane instance candidate; and
the selection criteria comprises a lowest one of the loads associated with the plurality of user plane instance candidates.

7. The method of claim 1, wherein the selection criteria comprises a time of day and at least one of:
a base station node internet protocol address;
an evolved Universal Mobile Telecommunications Service Terrestrial Radio Access Network cell global identifier (ECGI);
an International Mobile Equipment Identity (IMEI); or
an International Mobile Subscriber Identity (IMSI).

8. The method of claim 1, wherein the selection criteria further comprises at least one of a lowest latency or a lowest rate of transport control protocol retransmissions.

9. The method of claim 1, further comprising:
receiving, by the data processing hardware, a packet core network identifier at a given time of day, and
wherein the machine learning selection model uses the packet core network identifier at the given time of day to select the one of the plurality of user plane instance candidates to fulfill the request for user plane instance.

10. The method of claim 1, further comprising:
receiving, by the data processing hardware, a packet core network identifier at a given time of day, and
wherein the selection of the user plane instance by the machine learning selection model is based on the packet core network identifier at the given time of day and the user equipment associated with the request.

11. The method of claim 9, wherein the packet core network identifier comprises a base station node internet protocol address or an evolved Universal Mobile Telecommunications Service Terrestrial Radio Access Network cell global identifier.

12. The method of claim 10, wherein the packet core network identifier comprises a base station node internet protocol address or an evolved Universal Mobile Telecommunications Service Terrestrial Radio Access Network cell global identifier.

13. The method of claim 1, wherein the packet core network comprises a fifth generation (5G) core infrastructure.

14. The method of claim 1, wherein the packet core network comprises an evolved packet core network infrastructure for a fourth generation (4G) core infrastructure.

15. A method comprising:
receiving, at data processing hardware, from a session manager of a packet core network, a request for a control plane instance in the packet core network, the control plane instance configured to route packets for a user equipment during a communication session;
identifying, by the data processing hardware, a plurality of control plane instance candidates associated with a mobility manager of the packet core network, the plurality of control plane instance candidates configured to serve a geographic region of the mobility manager;
for each control plane instance candidate, determining, by the data processing hardware, one or more selection parameters corresponding to a subset of key performance indicators for the mobility manager in communication with the user equipment; and
selecting, by the data processing hardware, using a machine learning selection model, a respective control plane-instance candidate to fulfill the request for the control plane instance from the session manager based on the determined one or more selection parameters, wherein the machine learning selection model is:
configured to receive the one or more selection parameters determined for each of the plurality of control plane instance candidates and a selection criteria; and
trained on a plurality of training groups, each training group comprising a plurality of training control plane instances, each training control plane instance in the corresponding training group associated with one or more corresponding selection parameters and a selection criteria label, the selection criteria label indicating whether or not the corresponding training control plane instances satisfy the selection criteria.

16. The method of claim 15, wherein the session manager comprises a session management function of the packet core network, the packet core network comprising a fifth generation (5G) core infrastructure.

17. The method of claim 15, wherein the session manager corresponds to a gateway of the packet core network, the packet core network comprising a fourth generation (4G) core infrastructure.

18. The method of claim 15, further comprising:
generating, by the data processing hardware, a list of control plane instance candidates based on the one or more selection parameters determined for each of the plurality of control plane instance candidates; and
wherein selecting the one of the plurality of control plane instance candidates to fulfill the request comprises sequentially selecting the control plane instance candidate from the list of control plane instance candidates based on a previously selected control plane instance from the list of control plane instance candidates.

19. The method of claim 15, further comprising:
assigning, by the data processing hardware, a corresponding weight to each control plane instance candidate of the plurality of control plane instance candidates, the corresponding weight representing the one or more selection parameters determined for the corresponding control plane instance candidate;
ranking, by the data processing hardware, the plurality of control plane instance candidates based on the corresponding weight to each control plane instance candidate of the plurality of control plane instance candidates, and wherein selecting the one of the plurality of control plane instance candidates to fulfill the request comprises selecting the control plane instance candidate having a highest ranking as the one of the plurality of control plane instance candidates to fulfil the request for the control plane instance.

20. The method of claim 15, wherein selecting the one of the plurality of control plane instance candidates to fulfill the request comprises, determining, by the data processing hardware, that the one of the plurality of control plane instance candidates satisfies the selection criteria, the selection criteria corresponding to a minima or a maxima of the one or more selection parameters determined for each of the plurality of control plane instance candidates.

21. The method of claim 20, wherein:
one of the one or more selection parameters determined for each of the plurality of control plane instance candidates comprises a latency measurement associated with the corresponding control plane instance candidate; and
the selection criteria comprises a lowest one of the latency measurements associated with the plurality of control plane instance candidates.

22. The method of claim 20, wherein:
one of the one or more selection parameters determined for each of the plurality of control plane instance candidates comprises a load associated with the corresponding control plane instance candidate; and
the selection criteria comprises a lowest one of the loads associated with the plurality of control plane instance candidates.

23. The method of claim 15, wherein the selection criteria comprises a time of day and at least one of:
a Mobile Management Entity (MME);
an Access and Mobility Management Function (AMF);
an International Mobile Equipment Identity (IMEI); or
an International Mobile Subscriber Identity (IMSI).

24. The method of claim 15, wherein the selection criteria further comprises at least one of a lowest latency or a lowest rate of General Packet Radio Service Tunneling Protocol retransmissions.

25. The method of claim 15, further comprising:
receiving, by the data processing hardware, an identifier of a mobility manager at a given time of day, and
wherein the machine learning selection model uses the identifier of the mobility manager at the given time of day to select the one of the plurality of control plane instance candidates to fulfill the request for control plane instance.

26. The method of claim 15, further comprising:
receiving, by the data processing hardware, a packet core network identifier at a given time of day, and
wherein the machine learning selection model uses the identifier of the mobility manager at the given time of day and the user equipment associated with the request to select the one of the plurality of control plane instance candidates to fulfill the request for control plane instance.

27. The method of claim 25, wherein the identifier of the mobility manager identifies a Mobile Management Entity (MME).

28. The method of claim 26, wherein the identifier of the mobility manager identifies an Access and Mobility Management Function (AMF).

* * * * *